United States Patent
Hayashi et al.

(10) Patent No.: US 12,129,350 B2
(45) Date of Patent: Oct. 29, 2024

(54) POLYAMIDE RESIN FOAMED PARTICLES AND METHOD FOR PRODUCING SAME

(71) Applicant: JSP Corporation, Tokyo (JP)

(72) Inventors: Tatsuya Hayashi, Yokkaichi (JP); Akinobu Hira, Yokkaichi (JP)

(73) Assignee: JSP Corporation, Tokyo (JP)

(*) Notice: Subject to any disclaimer, the term of this patent is extended or adjusted under 35 U.S.C. 154(b) by 910 days.

(21) Appl. No.: 17/273,232

(22) PCT Filed: Sep. 4, 2019

(86) PCT No.: PCT/JP2019/034725
§ 371 (c)(1),
(2) Date: Mar. 3, 2021

(87) PCT Pub. No.: WO2020/050301
PCT Pub. Date: Mar. 12, 2020

(65) Prior Publication Data
US 2021/0189089 A1    Jun. 24, 2021

(30) Foreign Application Priority Data

Sep. 4, 2018 (JP) ................................ 2018-165318
May 20, 2019 (WO) ................. PCT/JP2019/019915

(51) Int. Cl.
*C08J 9/18* (2006.01)
*C08J 9/16* (2006.01)

(52) U.S. Cl.
CPC .............. *C08J 9/18* (2013.01); *C08J 2377/06* (2013.01)

(58) Field of Classification Search
CPC . C08J 9/18; C08J 2377/06; C08J 9/224; C08J 2203/06; C08J 9/122; C08J 9/232;
(Continued)

(56) References Cited

U.S. PATENT DOCUMENTS

2007/0036967 A1* 2/2007 Estur .................. B29C 44/3461
                                                                        264/142
2013/0209784 A1   8/2013 Nakagawa et al.
(Continued)

FOREIGN PATENT DOCUMENTS

CN    103201344 A    7/2013
CN    106687511 A    5/2017
(Continued)

OTHER PUBLICATIONS

International Search Report for PCT/JP2019/034725, mailed Oct. 8, 2019, and English Translation submitted herewith (5 pages).

*Primary Examiner* — K. Boyle
(74) *Attorney, Agent, or Firm* — Fitch, Even, Tabin & Flannery LLP

(57) ABSTRACT

A polyamide-based resin expanded bead comprising a foam layer formed by expanding a polyamide-based resin, wherein on a first DSC curve and a second DSC curve, the first DSC curve has a melting peak (intrinsic peak) having a peak top temperature on a low temperature side equal to or lower than a peak top temperature of a melting peak of the second DSC curve and a melting peak (high temperature peak) having a peak top temperature on a high temperature side exceeding the peak top temperature of the second DSC curve, and, the peak top temperature of the melting peak of the second DSC curve is 180° C. or higher and 280° C. or lower, and the polyamide-based resin expanded bead has an apparent density of 10 to 300 kg/m$^3$ and a closed cell ratio of 85% or more.

12 Claims, 1 Drawing Sheet

(58) Field of Classification Search
CPC .............. C08J 2205/044; C08J 2205/05; C08J 2300/106; C08J 2377/00; C08J 2400/106; C08J 2477/00; C08J 9/12; C08J 2205/052; B29C 44/3461; C08L 77/00
See application file for complete search history.

(56) References Cited

U.S. PATENT DOCUMENTS

| | | | |
|---|---|---|---|
| 2018/0044497 A1* | 2/2018 | Kondo | ........................ C08J 9/18 |
| 2019/0203009 A1* | 7/2019 | Keppeler | .................. C08J 9/122 |
| 2020/0032023 A1 | 1/2020 | Nakamoto | |

FOREIGN PATENT DOCUMENTS

| | | | |
|---|---|---|---|
| JP | S61-268737 | A | 11/1986 |
| JP | 2011-105879 | A | 6/2011 |
| JP | 2016-188342 | A | 11/2016 |
| JP | 2016-190989 | A | 11/2016 |
| JP | 2017-066279 | * | 4/2017 |
| JP | 2017-066279 | A | 4/2017 |
| JP | 2018-043487 | A | 3/2018 |
| JP | 2018-044127 | A | 3/2018 |
| WO | 2016/052387 | A1 | 4/2016 |
| WO | 2016/147582 | A1 | 9/2016 |
| WO | 2020/031803 | A1 | 2/2020 |
| WO | 2020/196893 | A1 | 10/2020 |

\* cited by examiner

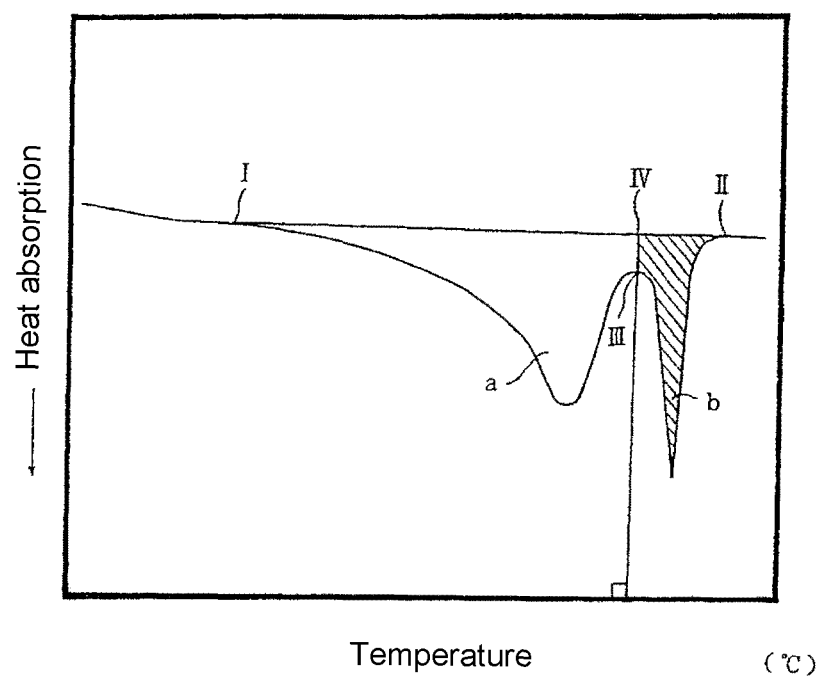

POLYAMIDE RESIN FOAMED PARTICLES AND METHOD FOR PRODUCING SAME

CROSS-REFERENCE TO RELATED APPLICATIONS

This application is a U.S. national phase application filed under 35 U.S.C. § 371 of International Application Number PCT/JP2019/034725, filed Sep. 4, 2019, designating the United States, which claims priority from International Application Number PCT/JP2019/019915, filed May 20, 2019, and from Japanese Application Number 2018-165318, filed Sep. 4, 2018.

FIELD OF THE INVENTION

The present invention relates to a polyamide-based resin expanded bead and a method for producing same.

BACKGROUND OF THE INVENTION

Materials applied in vehicle parts need to have, for example, high strength and high toughness. Further, from the viewpoint of reducing fuel costs, materials applied in vehicle parts also need to be lightweight. To meet such demands, investigations are being carried out into substituting resin materials in place of metal as the materials applied in vehicle parts. Polyamide-based resins are known as a plastic having high heat resistance, excellent in abrasion resistance and chemical resistance. An expanded molded body made by causing the polyamide-based resin to expand achieves weight saving while maintaining excellent heat resistance, abrasion resistance, chemical resistance, and the like, and as a result further application and development in automobile parts, electrical products, and the like is expected. For example, Patent Literature 1 discloses a polyamide-based resin expanded molded body.

An expanded molded body of a polyamide-based resin can be produced by an extrusion expanding method, an in-mold forming method using expanded beads, and the like. In recent years, in particular, there has been a demand for a method of obtaining expanded beads that can be applied an in-mold forming from which an expanded molded body having a complex three-dimensional shape matching the mold shape can be obtained.

For example, Patent Literature 2 describes a method for obtaining expanded beads by impregnating solid polyamide pellets having a specific size under pressure with a gas inert to the polyamide, transferring the pellets to an expanding apparatus, and then heating. Patent Literature 3 describes a method for obtaining polyamide expanded beads by opening one end of a vessel containing polyamide-based resin beads impregnated with a volatile blowing agent in a temperature range from 50° C. lower to 50° C. higher than the melting point of the beads. The method described in Patent Literature 2 is a method in which resin beads are impregnated with a blowing agent, then the resin beads impregnated with the blowing agent are taken out without expanding, and then heated by an expanding apparatus to obtain the expanded beads. This method is known as an "impregnation expanding method". On the other hand, in the method described in Patent Literature 3, resin beads dispersed in a dispersion medium in a closed apparatus are impregnated with a blowing agent, the temperature is raised to near the softening temperature of the resin, and then the resin beads are discharged outside the apparatus together with the dispersion medium under low pressure to obtain expanded beads. This method is called a "direct expanding method".

CITATION LIST

Patent Literature

PTL 1: WO 2016/147582
PTL 2: JP 2011-105879 A
PTL 3: JP 61-268737 A

SUMMARY OF INVENTION

The polyamide-based resin expanded molded body described in Patent Literature 1 has an insufficient compressive strength at high temperature.

Accordingly, firstly, one problem to be solved by the present invention (first object) is to provide a polyamide-based resin expanded bead having excellent compressive strength at high temperature and excellent in-mold formability.

Further, in the method described in Patent Literature 2, it is necessary to heat to a high temperature that is equal to or higher than the melting point of the polyamide-based resin in order to expand pellets composed of the polyamide-based resin to obtain an expanded bead. Polyamide-based resins generally have a high melting point, and they are difficult to expand it by steam heating or the like using water vapor under atmospheric pressure. It is necessary to expand polyamide-based resins by using hot air as a heat medium. However, since hot air is a gas, there are the problems that temperature control is difficult and it is difficult to uniformly heat a polyamide-based resin having a high melting point at a high temperature. Further, when a polyamide-based resin having a high melting point is expanded under atmospheric pressure, dedicated equipment capable of high-temperature heating is required, and so there is also the problem that capital investment costs increase.

In the method described in Patent Literature 3, there is the problem that in order to obtain the polyamide-based resin expanded beads, the temperature at the time of expanding needs to be set to a relatively high temperature range from 50° C. lower to 50° C. higher than the melting point of the polyamide-based resin beads, otherwise the polyamide expanded beads cannot be obtained.

Accordingly, a second problem to be solved by the present invention (second object) is to provide a method for producing a polyamide-based resin expanded bead capable of forming the polyamide-based resin bead at a temperature equal to or higher than 90° C. lower and less than 50° C. lower than a melting point of the polyamide-based resin bead.

In addition, although polyamide-based resin expanded beads have excellent heat resistance, due to that high heat resistance, fusion splicing properties may be reduced during in-mold forming, and a high forming pressure is required to ensure high fusion splicing properties. On the other hand, although it is conceivable to use a polyamide-based resin having a relatively low melting point in order to obtain a molded body having excellent fusion splicing properties, using a polyamide-based resin having a low melting point has a problem in that heat resistance is lowered.

Accordingly, a third problem to be solved by the present invention (third object) is to provide a polyamide-based resin expanded bead having excellent fusion splicing properties while maintaining high heat resistance.

Patent Literature 1 discloses multi-stage expanding as a means of increasing an expansion ratio and reducing weight. However, multi-stage expanding has a drawback in that the foam cell size increases and formability deteriorates due to a higher expansion ratio as a result of the growth of each of the foam cells in the expanded bead. On the other hand, the expansion ratio of the polyamide-based resin expanded molded product disclosed in Patent Literature 2 is only 7.5, which is a low ratio, and the lightweight property is insufficient.

Accordingly, a fourth problem to be solved by the present invention (fourth object) is to provide a polyamide-based resin expanded bead having an excellent lightweight property and excellent in-mold formability.

Generally, when expanding a crystalline resin, it is necessary to soften the resin, and so the expanding temperature tends to be near the melting point. Conventionally, polyamide-based resins are characterized by having excellent heat resistance but a high melting point, and so the expanding temperature has had to be increased. However, polyamide-based resins are also characterized by having high water absorption, and when they come into contact with water, the resin becomes plasticized. As a result of intensive studies in relation to the first and second objects, the present inventors discovered that by dispersing a polyamide-based resin bead constituted from a polyamide-based resin in water, and expanding the polyamide-based resin bead in a state in which the polyamide-based resin has absorbed water and is in a plasticized state, the polyamide-based resin bead can be expanded even at a temperature that is even lower than 50° C. lower than the melting point of the polyamide-based resin bead. Further, the present inventors found that a polyamide-based resin expanded bead having a specific fusion behavior has excellent compressive strength at high temperature and excellent in-mold formability.

Further, as a result of intensive studies in relation to the third object, the present inventors discovered that, in a polyamide-based resin expanded bead composed of a core layer and a coating layer, by setting the melting point of the core layer higher than the melting point of the coating layer, it is possible to provide, without increasing the expanding pressure, a polyamide-based resin expanded bead having excellent fusion splicing properties while maintaining high heat resistance.

Further, in relation to the fourth object, the present inventors discovered that by setting the apparent density and average foam cell size of the polyamide-based resin expanded bead to within specific ranges, it is possible to provide a polyamide-based resin expanded bead having an excellent lightweight property and excellent in-mold formability.

That is, the present invention provides the following [1] to [24].

[1] A polyamide-based resin expanded bead comprising a foam layer formed by expanding a polyamide-based resin, wherein on a first DSC curve and a second DSC curve obtained under the following condition 1, the first DSC curve has a melting peak (intrinsic peak) having a peak top temperature on a low temperature side equal to or lower than a peak top temperature of a melting peak of the second DSC curve and a melting peak (high temperature peak) on a high temperature side exceeding the peak top temperature of the melting peak of the second DSC curve, and, the peak top temperature of the melting peak of the second DSC curve is 180° C. or higher and 280° C. or lower, and the polyamide-based resin expanded bead has an apparent density of 10 to 300 kg/m$^3$ and a closed cell ratio of 85% or more:

Condition 1

A DSC curve measured when a foam layer of a polyamide-based resin expanded bead as a test piece is heated and melted from 30° C. to a temperature 30° C. higher than a temperature at the end of a melting peak at a heating rate of 10° C./min is defined as a first DSC curve, and a DSC curve measured when the test piece is then retained at the temperature for 10 minutes, cooled to 30° C. at a cooling rate of 10° C./min, and heated and melted again to a temperature 30° C. higher than the temperature at the end of the melting peak at a heating rate of 10° C./min is defined as a second DSC curve, each curve being measured based on heat-flux differential scanning calorimetry in accordance with JIS K7121-1987.

[2] The polyamide-based resin expanded bead according to [1], wherein a difference between the temperature of the peak top of the intrinsic peak and the temperature of the peak top of the high temperature peak is 10° C. or more.

[3] The polyamide-based resin expanded bead according to [1] or [2], wherein a ratio of a total heat of fusion of a heat of fusion of the intrinsic peak and a heat of fusion of the high temperature peak on the first DSC curve with respect to the total heat of fusion of the second DSC curve is 1.2 or more.

[4] The polyamide-based resin expanded bead according to any one of [1] to [3], wherein the ratio of the heat of fusion of the high temperature peak with respect to the total heat of fusion of the heat of fusion of the intrinsic peak and the heat of fusion of the high temperature peak on the first DSC curve is 10% or more and 45% or less.

[5] The polyamide-based resin expanded bead according to any one of [1] to [4], wherein the total heat of fusion of the heat of fusion of the intrinsic peak and the heat of fusion of the high temperature peak on the first DSC curve is 40 J/g or more.

[6] The polyamide-based resin expanded bead according to any one of [1] to [5], wherein the polymer-based resin constituting the foam layer is a polyamide copolymer.

[7] The polyamide-based resin expanded bead according to any one of [1] to [6], wherein the polyamide-based resin expanded bead has an average foam cell size of 20 to 200 µm.

[8] The polyamide-based resin expanded bead according to any one of [1] to [7], wherein the polyamide-based resin expanded bead has an apparent density of 10 to 150 kg/m$^3$.

[9] The polyamide-based resin expanded bead according to any one of [1] to [8], wherein the peak top temperature of the melting peak of the second DSC curve is 185° C. or higher and 280° C. or lower.

[10] The polyamide-based resin expanded bead according to any one of [1] to [9], wherein the foam layer has on a surface a coating layer constituted from a polyamide-based resin, the foam layer is a core layer, and a melting point (Tms) of the polyamide-based resin constituting the coating layer and a melting point (Tmc) of the polyamide-based resin constituting the core layer satisfy the following formula 1.

$$Tms < Tmc \qquad \text{(Formula 1)}$$

[11] The polyamide-based resin expanded bead according to [10], wherein a mass ratio (core layer/coating layer) between the core layer and the coating layer is 80/20 or more and 99/1 or less.

[12] The polyamide-based resin expanded bead according to [10] or [11], wherein the polyamide-based resin constituting the coating layer has a smaller heat of fusion than the heat of fusion of the polyamide-based resin constituting the core layer.

[13] A polyamide-based resin expanded bead comprising a foam layer formed by expanding a polyamide-based resin, wherein the foam layer has on a surface a coating layer constituted from a polyamide-based resin, the foam layer is a core layer, a melting point (Tms) of the polyamide-based resin constituting the coating layer and a melting point (Tmc) of the polyamide-based resin constituting the core layer satisfy the following formula 1, and the polyamide-based resin constituting the core layer has a melting point of 185° C. or higher and 280° C. or lower.

$$Tms<Tmc \qquad \text{(Formula 1)}$$

[14] The polyamide-based resin expanded bead according to [13], wherein a mass ratio (core layer/coating layer) between the core layer and the coating layer is 80/20 or more and 94/6 or less.

[15] The polyamide-based resin expanded bead according to [13] or [14], wherein the polyamide-based resin expanded bead is a polyamide-based resin expanded bead obtained by expanding a polyamide-based resin bead composed of a core layer and a coating layer layered on the core layer by coextrusion.

[16] A polyamide-based resin expanded bead comprising a foam layer formed by expanding a polyamide-based resin, wherein the polyamide-based resin expanded bead has an apparent density of 10 to 150 kg/m³, the polyamide-based resin expanded bead has an average foam cell size of 20 to 200 μm, and the polyamide-based resin has a melting point of 185° C. or higher and 280° C. or lower.

[17] The polyamide-based resin expanded bead according to [16], wherein the polymer-based resin is a polyamide copolymer.

[18] The polyamide-based resin expanded bead according to [16] or [17], wherein the polyamide-based resin expanded bead has a surface layer film thickness of 5 to 50 μm.

[19] The polyamide-based resin expanded bead according to any one of [16] to [18], wherein the polyamide-based resin has a flexural modulus of 1000 MPa or more.

[20] The polyamide-based resin expanded bead according to any one of [16] to [19], wherein the polyamide-based resin expanded bead has a closed cell ratio of 85% or more.

[21] A polyamide-based resin expanded bead comprising a foam layer formed by expanding a polyamide-based resin, wherein the polymer-based resin is composed of a polyamide copolymer, the polyamide-based resin expanded bead has an apparent density of 10 to 150 kg/m³, the polyamide-based resin expanded bead has an average foam cell size of 20 to 200 μm, and the polyamide-based resin has a melting point of 185° C. or higher and 280° C. or lower.

[22] A method for producing a polyamide-based resin expanded bead comprising a foam layer formed by expanding a polyamide-based resin having a melting point of 180° C. or higher and 280° C. or lower, the method comprising:

a step of dispersing a polyamide-based resin bead comprising a polyamide-based resin having a melting point of 180° C. or higher and 280° C. or lower in water in a closed vessel to obtain a dispersion;

a step of impregnating the polyamide-based resin bead in the dispersion with a blowing agent;

a step of retaining the dispersion at a temperature equal to or higher than 90° C. lower (Tm−90° C.) and less than 50° C. lower (Tm−50° C.) than a melting point (Tm) of the polyamide-based resin for a retention time of 1 minute or more and 60 minutes or less; and a step of controlling a temperature (Te) of the dispersion immediately before expanding to a temperature equal to or higher than 90° C. lower (Tm−90° C.) and less than 50° C. lower (Tm−50° C.) than a melting point (Tm) of the polyamide-based resin and then discharging the polyamide-based resin bead comprising the blowing agent together with water from inside of the closed vessel under a pressure lower than a pressure in the closed vessel to cause expanding.

[23] The method for producing a polyamide-based resin expanded bead according to [22], wherein the blowing agent is an inorganic physical blowing agent.

[24] The method for producing a polyamide-based resin expanded bead according to [22] or [23], wherein the polyamide-based resin is an end-capped polyamide-based resin that is end-capped with a carbodiimide compound.

In the present specification, the polyamide-based resin expanded bead according to the above [1] to [12] is referred to as the "first embodiment of the present invention", the method for producing a polyamide-based resin expanded bead according to the above [22] to [24] is referred to as the "second embodiment of the present invention", the polyamide-based resin expanded bead according to the above [13] to [15] is referred to as the "third embodiment of the present invention", and the polyamide-based resin expanded bead according to the above [16] to [21] is referred to as the "fourth embodiment of the present invention".

According to the present invention (first embodiment of the present invention), a polyamide-based resin expanded bead can be provided that has excellent compressive strength at high temperature and excellent in-mold formability.

Further, according to the present invention (second embodiment of the present invention), it is possible to provide a method for producing a polyamide-based resin expanded bead capable of expanding at a temperature equal to or higher than 90° C. lower and less than 50° C. lower than a melting point of a polyamide-based resin bead. When the production method of the present invention is used, temperature control is easy during expanding, and a polyamide-based resin expanded bead can be easily obtained. In addition, since the expanding temperature is significantly lowered and special equipment is not required, capital investment costs can be reduced. Thus, by using the production method of the present invention, an expanded bead having excellent heat resistance and that is capable of forming an expanded molded body having a complex three-dimensional shape can be obtained relatively easily.

Further, according to the present invention (third embodiment of the present invention), it is possible to provide a polyamide-based resin expanded bead having excellent fusion splicing properties while maintaining high heat resistance.

In addition, according to the present invention (fourth embodiment of the present invention), it is possible to provide a polyamide-based resin expanded bead having an excellent lightweight property and in-mold formability.

BRIEF DESCRIPTION OF DRAWING

FIG. 1 is an example of a DSC curve obtained by heat-flux differential scanning calorimetry.

DESCRIPTION OF EMBODIMENTS

[Polyamide-Based Resin Expanded Bead (First Embodiment of the Present Invention)]

A polyamide-based resin expanded bead according to a first embodiment of the present invention is a polyamide-based resin expanded bead comprising a foam layer formed by expanding a polyamide-based resin, wherein on a first DSC curve and a second DSC curve obtained under the following condition 1, the first DSC curve has a melting peak (hereinafter, also referred to as "intrinsic peak") having a peak top temperature on a low temperature side equal to or lower than a peak top temperature of a melting peak of the second DSC curve and a melting peak (hereinafter, also referred to as "high temperature peak") having a peak top temperature on a high temperature side exceeding the peak top temperature of the melting peak of the second DSC curve, and, the peak top temperature of the melting peak of the second DSC curve is 180° C. or higher and 280° C. or lower, and the polyamide-based resin expanded bead has an apparent density of 10 to 300 kg/m$^3$ and a closed cell ratio of 85% or more.

Condition 1

A DSC curve measured when a foam layer of a polyamide-based resin expanded bead as a test piece is heated and melted from 30° C. to a temperature 30° C. higher than a temperature at the end of a melting peak at a heating rate of 10° C./min is defined as a first DSC curve, and a DSC curve measured when the test piece is then retained at the temperature for 10 minutes, cooled to 30° C. at a cooling rate of 10° C./min, and heated and melted again to a temperature 30° C. higher than the temperature at the end of the melting peak at a heating rate of 10° C./min is defined as a second DSC curve, each curve being measured based on heat-flux differential scanning calorimetry in accordance with JIS K7121-1987.

The polyamide-based resin expanded bead according to the first embodiment of the present invention has a foam layer formed by expanding a polyamide-based resin. The polyamide-based resin expanded bead according to the first embodiment of the present invention may be composed of only a foam layer, or may also have a coating layer constituted from a polyamide-based resin on a surface of the foam layer (core layer) serving as a core layer. The polyamide-based resin expanded bead according to the first embodiment of the present invention is preferably obtained by the production method at of the second embodiment of the present invention described later.

On the first DSC curve of the polyamide-based resin expanded bead according to the first embodiment of the present invention, the difference between the temperature of the peak top of the intrinsic peak and the temperature of the peak top of the high temperature peak is preferably 10° C. or more, more preferably 12° C. or more, and still more preferably 15° C. or more. When the difference between the temperature of the peak top of the intrinsic peak and the temperature of the peak top of the high temperature peak is within the above range, heat resistance is improved.

The polyamide-based resin expanded bead according to the first embodiment of the present invention exhibits, on a first DSC curve measured by heat-flux differential scanning calorimetry by heating and melting from 30° C. to a temperature 30° C. higher than a temperature at the end of a melting peak at a heating rate of 10° C./min, an intrinsic peak inherent in the polyamide-based resin and a high temperature peak at a higher temperature side than the intrinsic peak. The total of the heat of fusion of all the high temperature peaks appearing on the high temperature side of the intrinsic peak is preferably 5 J/g or more, more preferably 9 J/g or more, still more preferably 12 J/g or more, and further preferably 15 J/g or more, and is preferably 50 J/g or less, more preferably 30 J/g or less, and still more preferably 20 J/g or less. When the heat of fusion is within the above range, the polyamide-based resin expanded bead has excellent formability during in-mold forming.

In the polyamide-based resin expanded bead according to the first embodiment of the present invention, the total heat of fusion on the first DSC curve (total heat of fusion of the heat of fusion of the intrinsic peak and the heat of fusion of the high temperature peak) is preferably 40 J/g or more, and more preferably 45 J/g or more. The total heat of fusion means that the larger the total heat of fusion on the first DSC curve is, the more the crystallization progresses. Expanded beads in which crystallization has proceeded have excellent heat resistance. Therefore, when the total heat of fusion on the first DSC curve is within the above range, the expanded bead has better heat resistance, which is preferable. On the other hand, the upper limit of the total heat of fusion on the first DSC curve is approximately 70 J/g, and is preferably 60 J/g.

On the first DSC curve of the polyamide-based resin expanded bead according to the first embodiment of the present invention, the ratio of the heat of fusion of the high temperature peak with respect to the total heat of fusion, which is obtained by summing the heat of fusion of the intrinsic peak and the heat of fusion of the high temperature peak, is preferably 5% or more, more preferably 7% or more, still more preferably 10% or more, and further preferably 15% or more. On the other hand, the ratio is preferably 45% or less, more preferably 40% or less, still more preferably 35% or less, and further preferably 30% or less. When the ratio of the heat of fusion of the high temperature peak is within the above range, an expanded bead can be obtained that has a high 50%-compressive stress at the melting point of the resin constituting the expanded bead and that has excellent compressive strength at high temperature, and an expanded bead molded body can be obtained that has excellent secondary expandability and fusion splicing properties during in-mold forming.

In the polyamide-based resin expanded bead according to the first embodiment of the present invention, the ratio of the total heat of fusion of a heat of fusion of the intrinsic peak and a heat of fusion of a high temperature peak on the first DSC curve of the polyamide-based resin expanded bead with respect to the total heat of fusion of the second DSC curve of the polyamide-based resin expanded bead (total heat of fusion of heat of fusion of intrinsic peak and heat of fusion of high temperature peak on first DSC curve/total heat of fusion of second DSC curve) is preferably 1.2 or more, and more preferably 1.5 or more. In the polyamide-based resin expanded bead according to the first embodiment of the present invention, the peak area in the first DSC curve is wider than the peak area in the second DSC curve by an amount roughly equal to the high temperature peak.

The endothermic energy of the high temperature peak of the polyamide-based resin expanded bead corresponds to the area of a high temperature peak b appearing on a higher temperature side than the intrinsic peak a on the DSC curve shown in FIG. 1, for example, and can be calculated in the following manner. First, as shown in FIG. 1, a straight line is drawn connecting a point I at 150° C. on the DSC curve with a point II indicating a fusion end temperature on the DSC curve. Next, a point IV is set at the intersection of the straight line connecting the point I and the point II with a straight line perpendicular to temperature on the horizontal axis of the graph that passes through a point III on the DSC curve corresponding to the valley between the intrinsic peak a (melting peak having a peak top temperature on a lower temperature side equal to or lower that the peak top temperature of the melting peak of the second DSC curve) and a high temperature peak b (melting peak having a peak top temperature on a higher temperature side exceeding the peak top temperature of the melting peak of the second DSC curve). The endothermic energy of the high temperature peak is taken as the area of the portion (hatched portion) enclosed by the straight line connecting the points IV and II, the straight line connecting the points III and IV, and the DSC curve connecting the points III and II. The high temperature peak b does not appear on the second DSC curve, which is measured after determining the first DSC curve in the manner described above, then retaining at a temperature 30° C. higher than that at the end of the melting peak for 10 minutes, cooling to 30° C. at a cooling rate of 10° C./min, and heating and melting again to a temperature 30° C. higher than the end of the melting peak at a heating rate of 10° C./min. However, the intrinsic peak appears on both the first DSC curve as well as the second DSC curve. The temperature on the horizontal axis of the graph indicated by the peak top of the intrinsic peak of the second DSC curve is taken as the melting point. Further, on the first DSC curve, when two or more melting peaks (high temperature peaks) having a peak top temperature appear on the high temperature side exceeding the peak top temperature of the melting peak of the second DSC curve, the heat of fusion of that high temperature peak means the total amount of heat of all the high temperature peaks.

The peak top temperature of a melting peak in the above second DSC curve is 180° C. or higher, preferably 185° C. or higher, more preferably 188° C. or higher, and still more preferably 190° C. or higher. On the other hand, from the viewpoint that temperature control during expanding is easy, the peak top temperature of a melting peak in the second DSC curve is 280° C. or lower, preferably 260° C. or lower, more preferably 230° C. or lower, and still more preferably 225° C. or lower.

The apparent density of the polyamide-based resin expanded bead according to the first embodiment of the present invention is 10 kg/m³ or more, preferably 30 kg/m³ or more, and more preferably 50 kg/m³ or more, and is 300 kg/m³ or less, more preferably 250 kg/m³ or less, and still more preferably 150 kg/m³ or less. When the apparent density of the expanded bead is within the above range, the expanded bead and a molded body made of the expanded beads hardly contract, and it is easier to obtain an excellent expanded bead molded body. The apparent density of the polyamide-based resin expanded bead is measured by the following method.

A measuring cylinder containing water at 23° C. is prepared. The mass W1 of about 500 cm³ of expanded beads that are left to stand for 2 days at a relative humidity of 50%, 23° C., and 1 atm is measured and sunk into the water using a wire mesh in the measuring cylinder. Considering the volume of the wire mesh, the volume V1 [cm³] of the expanded beads is measured based on the water level rising. The apparent density of the expanded bead is obtained by dividing the mass W1 [g] of the expanded beads by the volume V1 (W1/V1) and converting the unit into [kg/m³].

The polyamide-based resin expanded bead according to the first embodiment of the present invention has a closed cell ratio of 85% or more, preferably 88% or more, and more preferably 90% or more. When the polyamide-based resin expanded bead has a closed cell ratio satisfying the above range, an expanded bead having a low apparent density is easily obtained. Further, the expanded bead has excellent formability, and an expanded bead molded body prepared by in-mold forming of the expanded beads has excellent secondary expandability and fusion splicing properties. The closed cell ratio is a ratio of the volume of closed cells to the volume of the whole cells in an expanded bead, which may be determined using an air pycnometer based on ASTM-D2856-70.

The average foam cell size of the polyamide-based resin expanded bead according to the first embodiment of the present invention is preferably 20 to 200 μm, and more preferably 50 to 150 μm. The average foam cell size of the polyamide-based resin expanded bead is measured by the following method.

First, an expanded bead is split into about two through the center of the expanded bead, and a cross section thereof is photographed with a scanning electron microscope. Next, on the cross-sectional photograph, straight lines are drawn in 8 directions at equal intervals from near the center of the cross-section of the expanded bead, and the number of all the foam cells intersecting with the lines in total is counted. The value obtained by dividing the total length of the lines by the number of foam cells counted is defined as the foam cell size of the expanded bead. The procedure is performed in the same manner for 10 or more expanded beads, and the arithmetic mean of the foam cell sizes of the respective expanded beads is defined as the average foam cell size of the expanded beads.

The polyamide-based resin expanded bead according to the first embodiment of the present invention has excellent compressive strength at high temperature and excellent in-mold formability. Specifically, the 50%-compressive stress at the melting point is preferably 5 kPa or more, more preferably 8 kPa or more, and still more preferably 10 kPa or more. The method for measuring the 50%-compressive stress at the melting point may be carried out as follows.

The 50%-compressive stress at the melting point may be determined by measurement of the expanded bead using a thermal analysis apparatus (TMA, for example, "TMA 7100" manufactured by Hitachi High-Tech Science Corporation) in compression mode. Specifically, one expanded bead randomly selected is held in the minor axis direction of the expanded bead under a load of 1 mN with a compression probe, and heated to the melting point of the raw material resin. Then, while retaining the temperature at the melting point of the raw material resin, the load is increased at a speed of 30 mN/min, and the pressing depth of the probe (amount of displacement) is monitored. The stress at the point when the thickness of the expanded bead reaches 50% of the thickness of the expanded bead before compression is defined as the 50%-compressive stress at the melting point of the expanded bead.

When the polyamide-based resin expanded bead of the present invention has a foam layer as a core layer and a coating layer constituted from a polyamide-based resin on the surface of the foam layer (core layer), the melting point (Tms) of the polyamide-based resin constituting the coating layer is preferably lower than the melting point (Tmc) of the polyamide-based resin constituting the core layer. That is, it is preferable that the melting point (Tms) of the polyamide-based resin constituting the coating layer of the polyamide-based resin expanded bead and the melting point (Tmc) of the polyamide-based resin constituting the core layer of the polyamide-based resin expanded bead satisfy the following formula 1. Further, more preferably, the melting point (Tms) of the polyamide-based resin constituting the coating layer is more than 20° C. lower than the melting point (Tmc) of the polyamide-based resin constituting the core layer. That is, it is more preferable that the melting point (Tms) of the polyamide-based resin constituting the coating layer of the polyamide-based resin expanded bead and the melting point (Tmc) of the polyamide-based resin constituting the core layer of the polyamide-based resin expanded bead satisfy the following formula 2.

$$Tms < Tmc \quad \text{(Formula 1)}$$

$$Tms < (Tmc - 20° \text{ C.}) \quad \text{(Formula 2)}$$

When the melting point (Tmc) of the polyamide-based resin constituting the core layer and the melting point (Tms) of the polyamide-based resin constituting the coating layer satisfy the above formula 1, a polyamide-based resin expanded bead can be provided that has excellent fusion splicing properties while maintaining high heat resistance without increasing the forming pressure. Further, satisfying the above formula 2 is preferable because it is easier to obtain a polyamide-based resin expanded bead having excellent fusion splicing properties while maintaining high heat resistance without further increasing the forming pressure.

The mass ratio (core layer/coating layer) between the core layer and the coating layer in the polyamide-based resin expanded bead of the present invention is preferably 80/20 or more, more preferably 83.4/16.6 or more, still more preferably 85/15 or more, and further preferably 87.5/12.5 or more. Further, the mass ratio (core layer/coating layer) between the core layer and the coating layer is preferably 99/1 or less, more preferably 97.6/2.4 or less, still more preferably 96.8/3.2 or less, further preferably 95/5 or less, and still further preferably 94/6 or less.

In the polyamide-based resin expanded bead of the present invention, it is preferable that the polyamide-based resin constituting the coating layer is a polyamide-based resin different from the polyamide-based resin constituting the core layer, and that the heat of fusion of the polyamide-based resin constituting the coating layer is smaller than the heat of fusion of the polyamide-based resin constituting the core layer. When the heat of fusion of the polyamide-based resin constituting the coating layer is smaller than the heat of fusion of the polyamide-based resin constituting the core layer, a polyamide-based resin expanded bead can be provided that has excellent fusion splicing properties while maintaining high heat resistance.

The heat of fusion of the polyamide-based resin constituting the core layer and the heat of fusion of the polyamide-based resin constituting the coating layer were measured by the following methods for each of the core layer and the coating layer of the polyamide-based resin expanded bead.

The total heat of fusion in the core layer and the coating layer of the polyamide-based resin expanded bead was calculated as follows. The DSC curve measured based on heat-flux differential scanning calorimetry in accordance with JIS K7122-1987 when each measurement sample obtained by the above adjustments is heated and melted from 30° C. to a temperature 30° C. higher than a temperature at the end of a melting peak at a heating rate of 10° C./min is defined as a first DSC curve. For the first DSC curve, the amount of heat of the exothermic peak and the endothermic peak at the time of temperature rise was obtained, and the total amount of heat was obtained by subtracting the amount of heat of the exothermic peak from the amount of heat of the endothermic peak. When two or more endothermic peaks appeared, the heat of fusion of the endothermic peak means the total amount of heat of all the endothermic peaks. As the measurement apparatus, for example, a high-sensitivity differential scanning calorimeter "EXSTAR DSC7020" (manufactured by SII Nanotechnology) can be used.

[Method for Producing Polyamide-Based Resin Expanded Bead (Second Embodiment of the Present Invention)]

A method for producing a polyamide-based resin expanded bead according to a second embodiment of the present invention is a method for producing a polyamide-based resin expanded bead comprising a foam layer formed by expanding a polyamide-based resin having a melting point of 180° C. or higher and 280° C. or lower, the method characterized by comprising:

a step of dispersing a polyamide-based resin bead comprising a polyamide-based resin having a melting point of 180° C. or higher and 280° C. or lower in water in a closed vessel to obtain a dispersion;

a step of impregnating the polyamide-based resin bead in the dispersion with a blowing agent;

a step of retaining the dispersion at a temperature equal to or higher than 90° C. lower (Tm−90° C.) and less than 50° C. lower (Tm−50° C.) than a melting point (Tm) of the polyamide-based resin for a retention time of 1 minute or more and 60 minutes or less; and a step of controlling a temperature (Te) of the dispersion immediately before expanding to a temperature equal to or higher than 90° C. lower (Tm−90° C.) and less than 50° C. lower (Tm−50° C.) than a melting point (Tm) of the polyamide-based resin and then discharging the polyamide-based resin bead comprising the blowing agent together with water from inside of the closed vessel under a pressure lower than a pressure in the closed vessel to cause expanding.

The method for producing the polyamide-based resin expanded bead (hereinafter, also simply referred to as "expanded bead") according to the second embodiment of the present invention may have a step other than the steps described above, and may include other components in the steps described above.

[Step of Obtaining Dispersion]

The step of obtaining a dispersion is a step of obtaining a dispersion by dispersing a polyamide-based resin bead having a melting point of 180° C. or higher and 280° C. or lower in water in a closed vessel.

The method for dispersing the polyamide-based resin bead in water is not particularly limited and a known method may be used. For example, while stirring water with a stirrer, polyamide-based resin beads are added, and a dispersion is able to be obtained by further stirring.

On an as needed basis, it is preferable that a dispersant such as inorganic material such as aluminum oxide, tricalcium phosphate, magnesium pyrophosphate, zinc oxide, kaolin, mica, talc and smectite, and a dispersion aid such as anionic surfactant such as sodium dodecylbenzene sulfonate and sodium alkane sulfonate be added to the dispersion. The mass ratio between the polyamide-based resin beads and the dispersant (resin bead/dispersant) is preferably 20 to 2000, and more preferably 30 to 1000. The mass ratio between the dispersant and the dispersion aid (dispersant/dispersion aid) is preferably 1 to 500, and more preferably 1 to 100.

<Polyamide-Based Resin Bead>

The polyamide-based resin bead according to the second embodiment of the present invention includes a polyamide-based resin having a melting point of 180° C. or higher and 280° C. or lower. As the polyamide-based resin bead, one kind of polyamide-based resin may be used singly or in combinations of two or more thereof.

The polyamide-based resin bead may contain another thermoplastic resin as long as the object and effect of the present invention are not impaired. Examples of the another thermoplastic resin include a polyethylene-based resin, a polypropylene-based resin, a polystyrene-based resin, a vinyl acetate resins, a thermoplastic polyester resin, an acrylic acid ester resin, and a methacrylic acid ester resin.

From the viewpoint of obtaining a polyamide-based resin expanded bead having excellent heat resistance, abrasion resistance, and chemical resistance, the content of the polyamide-based resin in the polyamide-based resin bead is preferably 50% by mass or more, more preferably 70% by mass or more, still more preferably 80% by mass or more, further preferably 90% by mass or more, and particularly preferably 100% by mass.

From the viewpoint of obtaining a polyamide-based resin expanded bead having excellent heat resistance, abrasion resistance, and chemical resistance, the content of the another thermoplastic resin in the polyamide-based resin bead is preferably 30% by mass or less, more preferably 20% by mass or less, still more preferably 10% by mass or less, further preferably 5% by mass or less, and particularly preferably 0% by mass.

(Melting point (Tm) of polyamide-based resin)

From the viewpoint of obtaining a polyamide-based resin expanded bead having excellent heat resistance, the polyamide-based resin according to the second embodiment of the present invention has a melting point (Tm) of 180° C. or more, preferably 185° C. or more, more preferably 188° C. or more, and still more preferably 190° C. or more. On the other hand, from the viewpoint that temperature control during expanding is easy, the polyamide-based resin according to the second embodiment of the present invention has a melting point (Tm) of 280° C. or less, preferably 260° C. or less, more preferably 230° C. or less, and still more preferably 225° C. or less.

When the polyamide-based resin is one polyamide-based resin alone, the melting point of the polyamide-based resin is the melting point of that polyamide-based resin. When the polyamide-based resin is a mixture of two or more polyamide-based resins, or a mixture of a polyamide-based resin and another thermoplastic resin, the melting point of the polyamide-based resin is the melting point of the mixture kneaded with an extruder in advance.

In the present specification, the melting point (Tm) is a value calculated as the peak top temperature of the melting peak of a DSC curve obtained at a heating rate of 10° C./min by heat-flux differential scanning calorimetry based on JIS K7121-1987 employing "when measuring the fusion temperature after performing a certain heat treatment" as the state adjustment of the test piece (the heating rate and the cooling rate in the state adjustment of the test piece are 10° C./min in each case). When the DSC curve has a plurality of melting peaks, the peak top temperature of the melting peak having the largest area is employed as the fusion temperature. The test pieces of the polyamide-based resin and the polyamide-based resin bead were, for example, stored in a desiccator under a nitrogen atmosphere and then vacuum-sucked and stored so as avoid high temperature and high humidity conditions and not become hydrolyzed.

The measurement of the melting point is described in detail later.

To the polyamide-based resin bead, typically used various additives such as a foam conditioner, an antistatic agent, a conductivity imparting agent, a lubricant, an antioxidant, a UV absorber, a flame retardant, a metal deactivator, a colorant (pigment, dye, etc.), a crystal nucleating agent, and a filler, may be appropriately added on an as needed basis in addition to the polyamide-based resin. Examples of the foam conditioner include an inorganic foam conditioner such as talc, sodium chloride, calcium carbonate, silica, titanium oxide, gypsum, zeolite, borax, aluminum hydroxide, alum and carbon, and an organic foam conditioner such as a phosphoric acid-based compound, an amine-based compound and a polytetrafluoroethylene (PTFE). Although the amount of these various additives added is different depending on the intended use of a molded body, being preferably 25 parts by mass or less relative to 100 parts by mass of polymer components of the polyamide-based resin bead. The amount is more preferably 15 parts by mass or less, still more preferably 10 parts by mass or less, and further preferably 5 parts by mass or less.

The mass of one polyamide-based resin bead is appropriately set depending on the size, the apparent density, etc. of the target polyamide-based resin expanded bead, but is preferably 0.5 to 15.0 mg. With a mass in the above range, the apparent density can be improved. From this viewpoint, the lower limit of the mass of the polyamide-based resin bead is more preferably 1.0 mg, and still more preferably is 1.5 mg. On the other hand, the upper limit is more preferably 10.0 mg, still more preferably 7.0 mg, and furthermore preferably 5.0 mg.

As the polyamide-based resin bead used in the present invention, a resin bead having a core-shell structure can be used. By using a polyamide-based resin in which the core layer and the coating layer forming the core-shell structure have different properties, it is possible to obtain an expanded bead having various functions.

The mass ratio (core layer/coating layer) between the core layer and the coating layer is preferably 4 or more (that is, 80/20 or more), more preferably 5 or more (that is, 83.4/16.6 or more), and still more preferably 5.6 or more (that is, 85/15 or more), and further preferably 7 or more (that is, 87.5/12.5 or more). Further, the mass ratio (core layer/coating layer) is preferably 99 or less (that is, 99/1 or less), more preferably 40 or less (that is, 97.6/2.4 or less), still more preferably 30 or less (that is, 96.8/3.2 or less), and further preferably 19 or less (that is, 95/5 or less).

The method for producing the polyamide-based resin bead is not particularly limited, and a known method may be employed. The polyamide-based resin bead is obtained, for example, by a strand cutting method including the steps of feeding a polyamide-based resin and, on an as needed basis, an additive such as a foam conditioner and colorant, into an extruder to make a molten kneaded product by kneading, extruding the molten kneaded product in a strand form from a small hole of a die attached to the tip of the extruder, and cutting the extruded molten product to have a predetermined mass by a pelletizer, a hot cutting method including the step of extruding the molten kneaded product into a gas phase so as to be then immediately cut, or an underwater cutting method (UWC method) including the step of extruding the molten kneaded product into water so as to be then immediately cut.

<Polyamide-Based Resin>

Examples of the polyamide-based resin in the present specification include a polyamide and a polyamide copolymer, and a polyamide copolymer is preferred.

Examples of the polyamide include a homopolymer such as a poly(6-aminohexanoic acid) that is also known as poly(caprolactam) (polycaproamide, nylon 6), a poly(laurolactam) (nylon 12), a poly(hexamethylene adipamide) (nylon 66), a poly(7-aminoheptanoic acid) (nylon 7), a poly(8-aminooctanoic acid) (nylon 8), a poly(9-aminononanoic acid) (nylon 9), a poly(10-aminodecanoic acid) (nylon 10), a poly(11-aminoundecanoic acid) (nylon 11), a poly(hexamethylene sebacamide) (nylon 610), a poly(decamethylene sebacamide) (nylon 1010), a poly(hexamethylene azelamide) (nylon 69), a poly(tetramethylene adipamide) (nylon 46), a poly(tetramethylene sebacamide) (nylon 410), a poly(pentamethylene adipamide) (nylon 56) and a poly(pentamethylene sebacamide) (nylon 510). The polyamide copolymer refers to a copolymer having two or more repeating units, with at least a part of the repeating units each having an amide bond. Examples of the polyamide copolymer include a polycaproamide/polyhexamethylene adipamide copolymer (nylon 6/66), a caprolactam/hexamethylene diaminoadipic acid/lauryllactam copolymer (nylon 6/66/12), and a caprolactam/lauryllactam copolymer (nylon 6/12). As the polyamide-based resin, these polyamides and polyamide copolymers may be used singly or in combinations of two or more thereof. Among the polyamide-based resins, a polyamide-based resin made of one or two or more in combination of selected from the group consisting of nylon 6, nylon 66 and nylon 6/66 is preferred, and nylon 6/66 is more preferred.

Although the polyamide copolymer may be a block copolymer including a combination of a sequence of a certain quantity of the same repeating unit of amide and a sequence of a certain quantity of a different amide, or a random copolymer including different amides each randomly repeating, a random copolymer is preferred. If the polyamide copolymer is a random copolymer, in-mold forming of the polyamide-based resin expanded beads is able to be performed under a relatively low forming pressure.

The polyamide-based resin in the present specification has a flexural modulus of preferably 1000 MPa or more, more preferably 1200 MPa or more, still more preferably 1500 MPa or more. Amide-based elastomers generally have a flexural modulus of 600 MPa or less. It is preferable that the polyamide-based resin have a flexural modulus in the above range because the polyamide-based resin hardly contracts even when exposed to normal temperature after expanding due to the high flexural modulus, and so a high-expansion expanded bead can be obtained more easily. Also, another reason is that, due to the high flexural modulus, in-mold formability is excellent. The upper limit of the flexural modulus of the polyamide-based resin is about 3000 MPa.

The flexural modulus of a polyamide-based resin is able to be obtained by measurement in accordance with JIS K7171: 2016 after the test piece is left standing at a temperature of 23° C. and a humidity of 50% for 24 hours.

The polyamide-based resin in the present specification has a density of preferably 1.05 g/cm$^3$ or more, and preferably 1.1 g/cm$^3$ or more. Amide-based elastomers generally have a density of less than 1.05 g/cm$^3$. The measurement of the density is able to be performed based on the method described in ISO 1183-3.

It is preferable that the polyamide-based resin for use in the present invention be an end-capped polyamide-based resin with a capped functional group at a molecular chain end. Thereby, hydrolysis of the polyamide-based resin expanded bead in a production step is more reliably suppressed, so that a polyamide-based resin expanded bead that can be used for in-mold forming is easily obtained.

Further, the durability of a polyamide-based resin expanded bead molded body obtained by in-mold forming (hereinafter, also referred to simply as "expanded bead molded body" or "molded body") is enhanced.

Examples of an end-capping agent for capping the above molecular chain end include a carbodiimide compound, an oxazoline compound, an isocyanate compound and an epoxy compound.

Among these, a carbodiimide compound is preferred. Specific examples thereof include an aromatic monocarbodiimide such as bis(dipropylphenyl)carbodiimide (e.g., "Stabaxol 1-LF" manufactured by Rhein Chemie Corporation), an aromatic polycarbodiimide (e.g., "Stabaxol P", "Stabaxol P100" and "Stabaxol P400" manufactured by Rhein Chemie Corporation), and an aliphatic polycarbodiimide such as poly(4,4'-dicyclohexylmethane carbodiimide) (e.g., "Carbodilite LA-1" manufactured by Nisshinbo Chemical Inc.). These end-capping agents may be used singly or in combinations of two or more thereof.

When the polyamide-based resin bead has a core-shell structure, it is preferable that the functional groups at the molecular chain ends of both the core layer and the coating layer are capped.

The amount of the end-capping agent compounded is preferably 0.1 to 5 parts by mass, and more preferably 0.5 to 3 parts by mass, relative to 100 parts by mass of the polyamide-based resin.

As described above, the polyamide-based resin for use in the present invention is preferably a polyamide-based resin with an end-capped with one or more end-capping agents selected from the group consisting of a carbodiimide compound, an epoxy compound, and an isocyanate compound, more preferably a polyamide-based resin that is end-capped with a carbodiimide compound.

[Step of Impregnating with Blowing Agent]

The step of impregnating with a blowing agent is a step of impregnating a polyamide-based resin bead in a dispersion with a blowing agent and of allowing the polyamide-based resin beads to absorb water. Although the method for impregnating the polyamide-based resin beads with a blowing agent is not particularly limited, it is preferable that the polyamide-based resin beads be dispersed in water in a pressurizable closed vessel such as autoclave so as to be impregnated with the blowing agent. From the viewpoint of sufficiently impregnating the polyamide-based resin bead with the blowing agent in a short time, it is preferable that the impregnation of the polyamide-based resin beads with the blowing agent be performed by heating in addition to pressurization.

The step of impregnating with a blowing agent includes, in the case of pressurizing, a step of the pressure in the closed vessel reaching the pressure at the time of impregnation (hereinafter, also referred to as impregnation pressure) from atmospheric pressure.

Further, the step of impregnating with a blowing agent includes a step of heating the dispersion in which the polyamide-based resin beads are dispersed in water from ordinary temperature to the temperature at the time of impregnation (hereinafter, also referred to as impregnation temperature).

From the viewpoint of sufficiently impregnating the polyamide-based resin beads with the blowing agent in a short time, the temperature during impregnation by heating is preferably 50° C. or more, more preferably 80° C. or more, and preferably the melting point (Tm (° C.)) of the polyamide-based resin bead or less, more preferably (Tm−20 (° C.)) or less.

From the viewpoint of sufficiently impregnating the polyamide-based resin beads with the blowing agent in a short time, it is preferable that the pressure during impregnation under pressurized conditions (hereinafter also referred to as impregnation pressure) be controlled such that the pressure in the closed vessel after addition of blowing agent to the vessel containing the dispersion is preferably 1.5 MPa (G) or more, more preferably 2.5 MPa (G) or more, and preferably 7.0 MPa (G) or less, more preferably 5.0 MPa (G) or less.

"1.5 MPa (G)" means that the gauge pressure is 1.5 MPa.

The step of obtaining the dispersion by dispersing the polyamide-based resin bead in water and the step of impregnating with a blowing agent also have the role of allowing the polyamide-based resin bead to absorb water. From the viewpoint of plasticizing the polyamide-based resin bead by allowing it to sufficiently absorb water, a total time of the step of obtaining the dispersion and the step of impregnating with a blowing agent is preferably 20 minutes or more, and more preferably 30 minutes or more. On the other hand, from the viewpoint of the productivity of the polyamide-based resin expanded beads, the total time is preferably 60 minutes or less.

Further, from the viewpoint of plasticizing the polyamide-based resin bead by allowing it to sufficiently absorb water, the temperature rising rate in the step of impregnating with a blowing agent is preferably 10° C./min or less, and more preferably 7° C./min or less. On the other hand, from the viewpoint of the productivity of the polyamide-based resin expanded beads, the temperature rising rate is preferably 1° C./min or more, and more preferably 2° C./min or more.

(Blowing Agent)

As the foaming agent, a physical blowing agent may be used. Examples of the physical blowing agent include an organic physical blowing agent such as an aliphatic hydrocarbon such as propane, butane, pentane, hexane and heptane, an alicyclic hydrocarbon such as cyclopentane and cyclohexane, a halogenated hydrocarbon such as chlorofluoromethane, trifluoromethane, 1,1-difluoroethane, 1,1,1,2-tetrafluoroethane, methyl chloride, ethyl chloride, methylene chloride, and a &alkyl ether such as dimethyl ether, diethyl ether and methyl ethyl ether. Examples of the inorganic physical blowing agent include carbon dioxide, nitrogen, helium, argon and air.

From the viewpoints of less impact on the environment and excellence in safety due to inflammability, among the physical blowing agents, an inorganic physical blowing agent is preferred. Carbon dioxide or nitrogen is more preferred and carbon dioxide is still more preferred.

(Retention Step)

The retention step is a step of retaining the dispersion at a temperature equal to or higher than 90° C. lower (Tm−90° C.) and less than 50° C. lower (Tm−50° C.) than the melting point (Tm) of the polyamide-based resin for a retention time of 1 minute or more and 60 minutes or less.

From the viewpoint of plasticizing the polyamide-based resin by allowing it to sufficiently absorb water, and from the viewpoint of allowing the polyamide-based resin to be uniformly impregnated with the blowing agent, the retention temperature of the dispersion in the retention step is equal to or higher than a temperature 90° C. lower than the melting point (Tm) of the polyamide-based resin (Tm−90° C.), preferably equal to or higher than a temperature 80° C. lower than the melting point (Tm−80° C.), more preferably equal to or higher than a temperature 70° C. lower than the melting point (Tm−70° C.), still preferably equal to or higher than a temperature 65° C. lower than the melting point (Tm−65° C.), and is lower than a temperature 50° C. lower than the melting point (Tm) of the polyamide-based resin (Tm−50° C.), preferably equal to or lower than a temperature 55° C. lower than the melting point (Tm) (Tm−55° C.), more preferably equal to or lower than a temperature 57° C. lower than the melting point (Tm) (Tm−57° C.), and still preferably equal to or lower than a temperature 59° C. lower than the melting point (Tm) (Tm−59° C.).

Normally, when producing an expanded bead using a general-purpose resin such as a polypropylene resin as a base resin, the raw material resin is retained near its melting point. However, in the method for producing the polyamide-based resin expanded bead of the present invention, the polyamide-based resin expanded bead is produced by retaining at a temperature equal to or higher than 90° C. lower (Tm−90° C.) and less than 50° C. lower (Tm−50° C.) than the melting point (Tm) of the polyamide-based resin. This is performed because the polyamide-based resin is hygroscopic, so the polyamide-based resin bead is plasticized by the water used as the dispersion, which is considered to significantly lower its melting point, thereby enabling an expanded bead having a desired apparent density and closed cell ratio to be produced at a significantly lower melting point than that of the polyamide-based resin bead.

From the viewpoint of plasticizing the polyamide-based resin by allowing it to sufficiently absorb water, and the viewpoint of allowing the polyamide-based resin to be uniformly impregnated with the blowing agent, to obtain a polyamide-based resin expanded bead having a high closed cell ratio, the retention time in the retention step is 1 minute or more, preferably 5 minutes or more, more preferably 10 minutes or more, and still more preferably 13 minutes or more. Further, from the viewpoint of the productivity of the polyamide-based resin expanded beads, and the viewpoint of preventing hydrolysis of the polyamide-base resin, the retention time in the retention step is 60 minutes or less, preferably 40 minutes or less, more preferably 30 minutes or less, still preferably 20 minutes or less, and still more preferably 18 minutes or less. When the retention time is as described above, a polyamide-based resin expanded bead having a low apparent density and a high closed cell ratio can be obtained. The retention step may be performed by setting multiple steps in the above-described temperature range, or the temperature may be slowly increased over a sufficient time in the above-described temperature range. From the viewpoint of easier production, it is preferable to set a one-step process in the above-described temperature range (constant retention temperature) and retain for the time described above.

From the viewpoint of plasticizing the polyamide-based resin by allowing it to sufficiently absorb water and the viewpoint of allowing the polyamide-based resin to be uniformly impregnated with the blowing agent, it is preferable that the retention step be performed under pressurized conditions, and a same pressure as the impregnation pressure be retained. The pressure in the vessel containing the dispersion is controlled to preferably 1.5 MPa (G) or more, more preferably 2.5 MPa (G) or more. Also, the pressure in the vessel containing the dispersion is controlled to 7.0 MPa (G) or less, more preferably 5.0 MPa (G) or less.

[Expanding Step]

An expanding step is a step of causing expanding of the polyamide-based resin beads impregnated with a blowing agent.

Although the expanding method of the polyamide-based resin beads is not particularly limited, a expanding method including, following the retention step, a direct expanding method is preferred in which the polyamide-based resin beads impregnated with the blowing agent are discharged together with water to an atmosphere (usually atmospheric pressure) at a pressure lower than the pressure in the retention step to cause expanding.

From the viewpoint of obtaining a polyamide-based resin expanded bead having a low apparent density and a high closed cell ratio, the temperature Te of the dispersion immediately before expanding (hereinafter also referred to as expanding temperature) is equal to or higher than a temperature 90° C. lower than the melting point (Tm) of the polyamide-based resin (Tm−90° C.), preferably equal to or higher than a temperature 80° C. lower than the melting point (Tm) (Tm−80° C.), more preferably equal to or higher than a temperature 70° C. lower than the melting point (Tm) (Tm−70° C.), and still more preferably equal to or higher than a temperature 65° C. lower than the melting point (Tm) (Tm−65° C.). Also, the expanding temperature is lower than a temperature 50° C. lower than the melting point (Tm) of the polyamide-based resin (Tm−50° C.), preferably equal to or lower than a temperature 55° C. lower than the melting point (Tm) (Tm−55° C.), more preferably equal to or lower than a temperature 57° C. lower than the melting point (Tm) (Tm−57° C.), and still more preferably equal to or lower than a temperature 59° C. lower than the melting point (Tm) (Tm−59° C.).

In the expanding step, the pressure immediately before discharging (expanding pressure) is preferably 0.5 MPa (G) or more, more preferably 1.5 MPa (G) or more, still more preferably 2.5 MPa (G) or more. Also, the expanding pressure is preferably 10.0 MPa (G) or less, more preferably 7.0 MPa (G) or less, still more preferably 5 MPa or less.

[Polyamide-Based Resin Expanded Bead (Third Embodiment of the Present Invention)]

A polyamide-based resin expanded bead according to a third embodiment of the present invention is polyamide-based resin expanded bead comprising a foam layer formed by expanding a polyamide-based resin, wherein the foam layer has on a surface a coating layer constituted from a polyamide-based resin, the foam layer is a core layer, a melting point (Tms) of the polyamide-based resin constituting the coating layer and a melting point (Tmc) of the polyamide-based resin constituting the core layer satisfy the following formula 1.

$$Tms < Tmc \quad \text{(Formula 1)}$$

Further, as described in relation to the first embodiment of the present invention, the peak top temperature of the melting peak of the second DSC curve represents the melting point of the polyamide-based resin. In the polyamide-based resin expanded bead according to the third embodiment of the present invention, from the viewpoint of obtaining a polyamide-based resin expanded bead having excellent heat resistance, the polyamide-based resin constituting the core layer has a melting point of preferably 180° C. or higher, more preferably 185° C. or higher, still more preferably 188° C. or higher, further preferably 190° C. or higher, still further preferably 200° C. or higher, and even still further preferably 210° C. or higher. On the other hand, from the viewpoint that temperature control during expanding is easy, the polyamide-based resin constituting the core layer has a melting point of preferably 300° C. or lower, more preferably 290° C. or lower, still more preferably 280° C. or lower, further preferably 260° C. or lower, still further preferably 230° C. or lower, and even still further preferably 225° C. or lower. That is, the polyamide-based resin expanded bead according to the third embodiment of the present invention is preferably a polyamide-based resin expanded bead comprising a foam layer formed by expanding a polyamide-based resin, wherein the foam layer has on a surface a coating layer constituted from a polyamide-based resin, the foam layer is the core layer, the melting point (Tms) of the polyamide-based resin constituting the coating layer and the melting point (Tmc) of the polyamide-based resin constituting the core layer satisfy the above formula 1, and the polyamide-based resin constituting the core layer has a melting point in the range described above.

The polyamide-based resin expanded bead according to the third embodiment of the present invention is a so-called core-shell type polyamide-based resin expanded bead composed of a foam layer (core layer) formed by expanding a polyamide-based resin and a coating layer covering the core layer.

Examples of the method for coating the surface of the foam layer include a method of spreading a particulate coating material on the surface of the foam layer, a method of applying a solution-state coating material to the surface of the foam layer, and the like. The polyamide-based resin expanded bead according to the third embodiment of the present invention is preferably a polyamide-based resin bead composed of a core layer and a coating layer layered on the core layer by coextrusion, and more preferably is a polyamide-based resin expanded bead formed by expanding the foam layer.

The core layer constituting the polyamide-based resin bead composed of a core layer and a coating layer is constituted from a polyamide-based resin. The coating layer is constituted from a polyamide-based resin and covers the core layer.

In the case of a multilayer polyamide-based resin expanded bead layered by coextrusion, the coating layer is less likely to detach from the foam layer (core layer), and adherence of the coating layer to the expanding equipment can be suppressed.

The mass ratio (core layer/coating layer) between the core layer and the coating layer in the polyamide-based resin expanded bead according to the third embodiment of the present invention is preferably 80/20 or more, more preferably 83.4/16.6 or more, still more preferably 85/15 or more, and further preferably 87.5/12.5 or more. Further, the mass ratio (core layer/coating layer) between the core layer and the coating layer is preferably 99/1 or less, more preferably 97.6/2.4 or less, still more preferably 96.8/3.2 or less, further preferably 95/5 or less, and still further preferably 94/6 or less.

As the polyamide-based resin constituting the core layer and the coating layer, the polyamide-based resins described in relation to the second embodiment of the present invention can be used. Specific examples thereof include a polyamide and a polyamide copolymer.

Examples of the polyamide include a homopolymer such as a poly(6-aminohexanoic acid) that is also known as poly(caprolactam) (polycaproamide, nylon 6), a poly(laurolactam) (nylon 12), a poly(hexamethylene adipamide) (nylon 66), a poly(7-aminoheptanoic acid) (nylon 7), a poly(8-aminooctanoic acid) (nylon 8), a poly(9-aminononanoic acid) (nylon 9), a poly(10-aminodecanoic acid) (nylon 10), a poly(11-aminoundecanoic acid) (nylon 11), a poly(hexamethylene sebacamide) (nylon 610), a poly(decamethylene sebacamide) (nylon 1010), a poly(hexamethylene azelamide) (nylon 69), a poly(tetramethylene adipamide) (nylon 46), a poly(tetramethylene sebacamide) (nylon 410), a poly (pentamethylene adipamide) (nylon 56) and a poly(pentamethylene sebacamide) (nylon 510). The polyamide copolymer refers to a copolymer having two or more repeating units, with at least a part of the repeating units each having an amide bond. Examples of the polyamide copolymer include a polycaproamide/polyhexamethylene adipamide copolymer (nylon 6/66), a caprolactam/hexamethylene diaminoadipic acid/lauryllactam copolymer (nylon 6/66/12), and a caprolactam/lauryllactam copolymer (nylon 6/12). As the polyamide-based resin, the polyamides and the polyamide copolymers may be used singly or in combinations of two or more thereof. Among the polyamide-based resins, a polyamide-based resin made of one or two or more in combination of selected from the group consisting of nylon 6, nylon 66 and nylon 6/66 is preferred, and nylon 6/66 is more preferred.

The polyamide-based resin has a flexural modulus of preferably 1000 MPa or more, more preferably 1200 MPa or more, and still more preferably 1500 MPa or more. Amide-based elastomers generally have a flexural modulus of 600 MPa or less. The flexural modulus of the polyamide-based resin is preferably within the above range because a high-expansion expanded bead that is less susceptible to contraction even when exposed to ordinary temperatures after expanding due to having a high flexural modulus can be obtained more easily. The upper limit of the flexural modulus of the polyamide-based resin is about 3000 MPa.

The flexural modulus of the polyamide-based resin can be determined by leaving the test piece to stand at a temperature of 23° C. and a humidity of 50% for 24 hours or more, and then measuring in accordance with JIS K7171: 2016.

The density of the polyamide-based resin is preferably 1.05 g/cm$^3$ or more, and preferably 1.1 g/cm$^3$ or more. The density of amide-based elastomers is generally less than 1.05 g/cm$^3$.

However, from the viewpoint of having different melting points, it is preferable for the polyamide-based resin constituting the core layer and the polyamide-based resin constituting the coating layer to be different types. From the viewpoint of having a high melting point and excellent heat resistance, the polyamide-based resin constituting the core layer is more preferably a polyamide. On the other hand, from the viewpoint that the melting point is relatively low and the fusion splicing properties of the expanded beads with each other can be improved, the polyamide-based resin constituting the coating layer is more preferably a polyamide copolymer. Among polyamide-based resins, polyamides have a high melting point and excellent heat resistance. However, when trying to obtain an expanded bead molded body composed of a polyamide, the fusion splicing properties of the expanded beads with each other may be inferior. Therefore, a polyamide-based resin expanded bead molded body obtained from polyamide-based resin expanded beads in which a polyamide is used for the polyamide-based resin constituting the core layer and a polyamide copolymer is used for the polyamide-based resin constituting the coating layer allows high heat resistance and excellent fusion splicing properties to both be effectively achieved.

Further, since the coating layer is located on the surface of the expanded bead, it is preferable that the polyamide-based resin constituting the coating layer is an end-capped polyamide-based resin in which the functional group at the end of the molecular chain is capped. When the polyamide-based resin constituting the coating layer is an end-capped polyamide-based resin, hydrolysis during the production process of the polyamide-based resin expanded bead can be more reliably suppressed, and it is easier to obtain a polyamide-based resin expanded bead that can be used for in-mold forming. As the end-capping agent for capping the end of the molecular chain, those described with reference to the second embodiment of the present invention can be used, and the preferred range is also the same.

For example, a carbodiimide compound, an oxazoline compound, an isocyanate compound, an epoxy compound, and the like can be used, and a carbodiimide compound is preferable. Specific examples thereof include an aromatic monocarbodiimide such as bis(dipropylphenyl)carbodiimide, an aromatic polycarbodiimide, and an aliphatic polycarbodiimide such as poly(4,4'-dicyclohexylmethanecarbodiimide). These end-capping agents may be used singly or in combinations of two or more thereof.

In the third embodiment of the present invention, from the viewpoint of more reliably suppressing hydrolysis in the production process of the polyamide-based resin expanded bead, it is preferable to cap not only a functional group at the end of the molecular chain of the polyamide-based resin constituting the coating layer, but also a functional group at the end of the molecular chain of the polyamide-based resin constituting the core layer.

Further, the amount of the end-capping agent compounded is preferably 0.1 to 5 parts by mass, and more preferably 0.5 to 3 parts by mass, relative to 100 parts by mass of the polyamide-based resin constituting the core layer or coating layer.

In the third embodiment of the present invention, it is preferable that the expanded bead does not include a crystallization inhibitory compound such as resorcinol, phenol, ethyl phenol or benzyl alcohol.

In the polyamide-based resin expanded bead according to the third embodiment of the present invention, the melting point (Tms) of the polyamide-based resin constituting the coating layer is lower than the melting point (Tmc) of the polyamide-based resin constituting the core layer. That is, the melting point (Tms) of the polyamide-based resin constituting the coating layer of the polyamide-based resin expanded bead and the melting point (Tmc) of the polyamide-based resin constituting the core layer of the polyamide-based resin expanded bead satisfy the following formula 1. Further, preferably, the melting point (Tms) of the polyamide-based resin constituting the coating layer is more than 20° C. lower than the melting point (Tmc) of the polyamide-based resin constituting the core layer. That is, it is preferable that the melting point (Tms) of the polyamide-based resin constituting the coating layer of the polyamide-based resin expanded bead and the melting point (Tmc) of the polyamide-based resin constituting the core layer of the polyamide-based resin expanded bead satisfy the following formula 2.

$$Tms<Tmc \qquad \text{(Formula 1)}$$

$$Tms<(Tmc-20°\text{ C.}) \qquad \text{(Formula 2)}$$

When the melting point (Tmc) of the polyamide-based resin constituting the core layer and the melting point (Tms) of the polyamide-based resin constituting the coating layer satisfy the above formula 1, a polyamide-based resin expanded bead can be provided that has excellent fusion splicing properties while maintaining high heat resistance without increasing the forming pressure. Further, satisfying the above formula 2 is preferable because it is easier to obtain a polyamide-based resin expanded bead having excellent fusion splicing properties while maintaining high heat resistance without further increasing the forming pressure.

In the third embodiment of the present invention, the melting point (Tms) of the polyamide-based resin constituting the coating layer and the melting point (Tmc) of the polyamide-based resin constituting the core layer are obtained by preparing a measurement sample based on the method described below, and measuring the heat of fusion based on heat-flux differential scanning calorimetry in accordance with the above-mentioned condition 1. Condition 1 is as described with respect to the first embodiment of the present invention, and specifically is as follows.

Condition 1

A DSC curve measured when heating and melting from 30° C. to a temperature 30° C. higher than a temperature at the end of a melting peak at a heating rate of 10° C./min is defined as a first DSC curve, and a DSC curve measured when after then retaining at the temperature for 10 minutes, cooling to 30° C. at a cooling rate of 10° C./min, and heating and melting again to a temperature 30° C. higher than the temperature at the end of the melting peak at a heating rate of 10° C./min is defined as a second DSC curve, each curve being measured based on heat-flux differential scanning calorimetry in accordance with JIS K7121-1987.

[Preparation of Measurement Sample]

(Heat of Fusion Measurement Sample of Expanded Bead Coating Layer)

Surface layer portions including the surface of the expanded bead are cut and gathered together to make a test piece. In the cutting process, a measurement sample having a mass of 1/10 to 1/6 of the bead mass of the expanded bead before the cutting process is collected from the whole surface of one expanded bead.

(Heat of Fusion Measurement Sample of Expanded Bead Core Layer)

The whole surface of the expanded bead is cut off and removed, and the remaining part of the expanded bead, which has a mass of 1/5 to 1/3 of the bead mass of the expanded bead before the cutting process, is collected as a measurement sample.

In the polyamide-based resin expanded bead according to the third embodiment of the present invention, it is preferable that the polyamide-based resin constituting the coating layer is a polyamide-based resin different from the polyamide-based resin constituting the core layer, and that the crystallinity of the polyamide-based resin constituting the coating layer is lower than the crystallinity of the polyamide-based resin constituting the core layer. When the crystallinity of the polyamide-based resin constituting the coating layer is lower than the crystallinity of the polyamide-based resin constituting the core layer, it is considered that the water absorbency of the coating layer is increased. Therefore, when water is used during production of expanded beads, plasticization by the water tends to occur, and expanding is possible at a relatively low temperature. Therefore, by setting the crystallinity of the polyamide-based resin constituting the coating layer to be lower than the crystallinity of the polyamide-based resin constituting the core layer, a polyamide-based resin expanded bead can be provided that has excellent fusion splicing properties while maintaining high heat resistance. The crystallinity of the polyamide-based resin constituting the core layer and the crystallinity of the polyamide-based resin constituting the coating layer were measured by preparing measurement samples in the same manner as the samples for measuring the heat of fusion, and measuring in the following manner for each of the core layer and the coating layer of the polyamide-based resin expanded bead.

The DSC curve measured based on heat-flux differential scanning calorimetry in accordance with JIS K7122-1987 when heated and melted from 30° C. to a temperature 30° C. higher than a temperature at the end of a melting peak at a heating rate of 10° C./min is defined as a first DSC curve. For the first DSC curve, the amount of heat of the exothermic peak and the endothermic peak at the time of temperature rise was obtained, and the total amount of heat was obtained by subtracting the amount of heat of the exothermic peak from the amount of heat of the endothermic peak. The total amount of heat is divided by the perfect crystal heat quantity of 230 J/g in the case of the nylon 6-based resin and by the perfect crystal heat quantity of 226 J/g in the case of the nylon 66-based resin, and multiplied by 100. From this, the crystallinity of the polyamide-based resin constituting the core layer of the polyamide-based resin expanded bead and the crystallinity of the polyamide-based resin constituting the coating layer of the polyamide-based resin expanded bead can be obtained.

In the polyamide-based resin expanded bead according to the third embodiment of the present invention, it is preferable that the polyamide-based resin constituting the coating layer is a polyamide-based resin different from the polyamide-based resin constituting the core layer, and that the heat of fusion of the polyamide-based resin constituting the coating layer is smaller than the heat of fusion of the polyamide-based resin constituting the core layer. When the heat of fusion of the polyamide-based resin constituting the coating layer is smaller than the heat of fusion of the polyamide-based resin constituting the core layer, a polyamide-based resin expanded bead can be provided that has excellent fusion splicing properties while maintaining high heat resistance.

The heat of fusion of the polyamide-based resin constituting the core layer and the heat of fusion of the polyamide-based resin constituting the coating layer can be measured by using the method described in relation to the first embodiment of the present invention for each of the core layer and the coating layer of the polyamide-based resin expanded bead. Specifically, the measurements were carried out as follows.

The total heat of fusion in the core layer and the coating layer of the polyamide-based resin expanded bead was calculated as follows. The DSC curve measured based on heat-flux differential scanning calorimetry in accordance with JIS K7122-1987 when each measurement sample obtained by the above adjustments is heated and melted from 30° C. to a temperature 30° C. higher than a temperature at the end of a melting peak at a heating rate of 10° C./min is defined as a first DSC curve. For the first DSC curve, the amount of heat of the exothermic peak and the endothermic peak at the time of temperature rise was obtained, and the total amount of heat was obtained by subtracting the amount of heat of the exothermic peak from the amount of heat of the endothermic peak. When two or more endothermic peaks appeared, the heat of fusion of the endothermic peak means the total amount of heat of all the endothermic peaks. As the measurement apparatus, for example, a high-sensitivity differential scanning calorimeter "EXSTAR DSC7020" (manufactured by SII Nanotechnology) can be used.

The apparent density of the polyamide-based resin expanded bead according to the third embodiment of the present invention is preferably 50 kg/m$^3$ or more, more preferably 60 kg/m$^3$ or more, and still more preferably 70 kg/m³ or more, and preferably 250 kg/m³ or less, more preferably 200 kg/m³ or less, and still more preferably 150 kg/m³ or less. When the apparent density of the expanded bead is within the above range, the expanded bead and a molded body made of the expanded beads hardly contract, and it is easier to obtain an excellent expanded bead molded body. The apparent density of the polyamide-based resin expanded bead is measured by the method described in the examples, which are described later.

The polyamide-based resin expanded bead according to the third embodiment of the present invention has a closed cell ratio of preferably 85% or more, more preferably 88% or more, and still more preferably 90% or more. When the polyamide-based resin expanded bead has a closed cell ratio satisfying the above range, an expanded bead having a low apparent density is easily obtained. Further, the expanded bead has excellent formability, and an expanded bead molded body prepared by in-mold forming of the expanded beads has excellent secondary expandability and fusion splicing properties. The method for measuring the closed cell ratio is as described in relation to the first embodiment of the present invention.

The polyamide-based resin expanded bead according to the third embodiment of the present invention has excellent heat resistance. Specifically, an extrapolation temperature of a compression amount-temperature curve when the temperature is raised while compressing the molded body with a thermal analyzer is preferably 160° C. or higher, more preferably 180° C. or higher, and still more preferably 190° C. The method for evaluating heat resistance in the third embodiment of the present invention may be carried out by, for example, cutting out a 5 mm-square molded body from the molded body, monitoring an indentation depth (displacement amount) of a probe when the temperature is raised while compressing using a thermal analyzer (TMA; for example, "TMA7100" manufactured by Hitachi High-Tech Science Corporation), and determining the heat resistance from the temperature when the thickness of the sample has been compressed by 5% with respect to the thickness of the sample before the test.

The polyamide-based resin expanded bead according to the third embodiment of the present invention can be an expanded bead molded body having excellent fusion splicing properties. Specifically, the expanded bead molded body has a fusion ratio of preferably 75% or more, more preferably 80% or more, and still more preferably 85% or more. The fusion ratio of the expanded bead molded body is determined based on the ratio of the number of expanded beads in which the material failure is occurred among the expanded beads exposed on a fracture surface when the expanded bead molded body is fractured. Specifically, first, a test piece (100 mm length×100 mm width×thickness: thickness of the molded body) is cut out from the expanded bead molded body, a notch of about 5 mm is cut in the thickness direction of each test piece with a cutter knife or the like, and the test piece is fractured from the notch. Next, a number (n) of expanded beads present on the fracture surface of the expanded bead molded body and a number (b) of expanded beads in which the material failure has occurred are measured, and the fusion ratio (%) is taken as the ratio (bin) between (b) and (n) expressed as a percentage.

By the direct expanding method described in the second embodiment of the present invention, a polyamide-based resin expanded bead having excellent heat resistance can be obtained. Therefore, it is preferable to obtain the polyamide-based resin expanded bead according to the third embodiment of the present invention by the production method according to the second embodiment of the present invention.

[Polyamide-Based Resin Expanded Bead (Fourth Embodiment of the Present Invention)]

A polyamide-based resin expanded bead according to a fourth embodiment of the present invention is a polyamide-based resin expanded bead comprising a foam layer formed by foaming a polyamide-based resin, wherein the polyamide-based resin expanded bead has an apparent density of 10 to 150 kg/m³, and the polyamide-based resin expanded bead has an average foam cell size of 20 to 200 μm. Among them, the polyamide-based resin expanded bead is preferably a polyamide-based resin expanded bead obtained using a polyamide copolymer as a base resin, wherein the polyamide-based resin expanded bead has an apparent density of 10 to 150 kg/m³ and an average foam cell size of 20 to 200 μm.

Further, in the polyamide-based resin expanded bead according to the fourth embodiment of the present invention, it is preferable that the polyamide-based resin has a melting point of 185° C. or higher and 280° C. or lower.

That is, a preferable polyamide-based resin expanded bead according to the fourth embodiment of the present invention is a polyamide-based resin expanded bead comprising a foam layer formed by expanding a polyamide-based resin, wherein the polyamide-based resin expanded bead has an apparent density of 10 to 150 kg/m³, the polyamide-based resin expanded bead has an average foam cell size of 20 to 200 μm, and the polyamide-based resin has a melting point of 185° C. or higher and 280° C. or lower.

The polyamide-based resin expanded bead according to the fourth embodiment of the present invention is a polyamide-based resin expanded bead having a foam layer formed by expanding a polyamide-based resin, and is preferably a polyamide-based resin expanded bead obtained using a polyamide copolymer for a base resin.

Examples of the polyamide-based resin include a polyamide and a polyamide copolymer.

Examples of the polyamide include a homopolymer such as a poly(6-aminohexanoic acid) that is also known as poly(caprolactam) (polycaproamide, nylon 6), a poly(laurolactam) (nylon 12), a poly(hexamethylene adipamide) (nylon 66), a poly(7-aminoheptanoic acid) (nylon 7), a poly(8-aminooctanoic acid) (nylon 8), a poly(9-aminononanoic acid) (nylon 9), a poly(10-aminodecanoic acid) (nylon 10), a poly(11-aminoundecanoic acid) (nylon 11), a poly(hexamethylene sebacamide) (nylon 610), a poly(decamethylene sebacamide) (nylon 1010), a poly(hexamethylene azelamide) (nylon 69), a poly(tetramethylene adipamide) (nylon 46), a poly(tetramethylene sebacamide) (nylon 410), a poly(pentamethylene adipamide) (nylon 56) and a poly(pentamethylene sebacamide) (nylon 510). Examples of the polyamide copolymer include a polycaproamide/polyhexamethylene adipamide copolymer (nylon 6/66), a caprolactam/hexamethylene diaminoadipic acid/lauryllactam copolymer (nylon 6/66/12), and a caprolactam/lauryllactam copolymer (nylon 6/12). These polyamide copolymers may be used singly or in combinations of two or more thereof. Among the polyamide copolymers, it is preferable to include nylon 6/66, and it is more preferable to use nylon 6/66 alone.

As the polyamide-based resin, these polyamides and the polyamide copolymers may be used singly or in combinations of two or more thereof.

It is noted that the polyamide-based resin has excellent heat resistance due to having a high melting point. However, since the polyamide copolymer has a relatively low melting point as compared with the polyamide and can be produced at a relatively low temperature, production can be carried out at a temperature at which it is less likely to be hydrolyzed, and in-mold formability is excellent.

Therefore, when a polyamide copolymer is used, the polyamide-based resin according to the fourth embodiment of the present invention has excellent in-mold formability, and therefore it is not necessary for the polyamide-based resin to be an end-capped polyamide-based resin in which the functional group at the end of the molecular chain is capped.

Although the polyamide copolymer may be a block copolymer including a combination of a sequence of a certain quantity of the same repeating unit of amide and a sequence of a certain quantity of a different amide, or a random copolymer including different amides each randomly repeating, a random copolymer is preferred. The polyamide copolymer in the form of random copolymer tends to have a lower melting point than block copolymer, which results in polyamide-based resin expanded beads with excellent in-mold forming in particular.

The polyamide-based resin has a flexural modulus of preferably 1000 MPa or more, more preferably 1200 MPa or more, and still more preferably 1500 MPa or more. Amide-based elastomers generally have a flexural modulus of 600 MPa or less. The flexural modulus of the polyamide-based resin is preferably within the above range because a high-expansion expanded bead that is less susceptible to contraction even when exposed to ordinary temperatures after expanding due to having a high flexural modulus can be obtained more easily. The upper limit of the flexural modulus of the polyamide-based resin is about 3000 MPa.

The flexural modulus of the polyamide-based resin can be determined by leaving the test piece to stand at a temperature of 23° C. and a humidity of 50% for 24 hours or more, and then measuring in accordance with JIS K7171: 2016.

The density of the polyamide-based resin is preferably 1.05 $g/cm^3$ or more, and preferably 1.1 $g/cm^3$ or more. The density of amide-based elastomers is generally less than 1.05 $g/cm^3$. The density can be measured based on the method described in ISO 1183-3.

The polyamide-based resin expanded bead according to the fourth embodiment of the present invention has a low apparent density and a small average foam cell size. When the apparent density is low and the average foam cell size is small, the expanded bead has excellent secondary expandability during in-mold forming in order to obtain a molded body. In addition, water cooling time can be shortened, and as a result, the overall forming time can be shortened. From the above viewpoint, the polyamide-based resin expanded bead according to the fourth embodiment of the present invention has an apparent density of preferably 10 to 150 $kg/m^3$, and more preferably 30 to 100 $kg/m^3$. The apparent density of the polyamide-based resin expanded bead is measured in the same manner as the method for measuring the apparent density of the polyamide-based resin expanded bead according to the second embodiment.

Specifically, a measuring cylinder containing water at 23° C. is prepared. The mass W1 of about 500 $cm^3$ of expanded beads that are left to stand for 2 days at a relative humidity of 50%, 23° C., and 1 atm is measured and sunk into the water using a wire mesh in the measuring cylinder. Considering the volume of the wire mesh, the volume V1 [$cm^3$] of the expanded beads is measured based on the water level rising. The apparent density of the expanded bead is obtained by dividing the mass W1 [g] of the expanded beads by the volume V1 (W1/V1) and converting the unit into [$kg/m^3$].

Further, from the above viewpoint, the average foam cell size of the polyamide-based resin expanded bead according to the fourth embodiment of the present invention is preferably 20 to 200 nm, and more preferably 50 to 150 nm. The average foam cell size of the polyamide-based resin expanded bead is measured by the following method.

First, an expanded bead is split into about two through the center of the expanded bead, and a cross section thereof is photographed with a scanning electron microscope. Next, on the cross-sectional photograph, straight lines are drawn in 8 directions at equal intervals from near the center of the cross-section of the expanded bead, and the number of all the foam cells intersecting with the lines in total is counted. The value obtained by dividing the total length of the lines by the number of foam cells counted is defined as the foam cell size of the expanded bead. The procedure is performed in the same manner for 10 or more expanded beads, and the arithmetic mean of the foam cell sizes of the respective expanded beads is defined as the average foam cell size of the expanded beads.

The polyamide-based resin expanded bead according to the fourth embodiment of the present invention has a closed cell ratio of preferably 85% or more, more preferably 88% or more, and still more preferably 90% or more. The method for measuring the closed cell ratio is as described in relation to the first embodiment of the present invention. Specifically, the closed cell ratio is the ratio of the volume of closed cells relative to the volume of all the cells in the expanded bead, and may be determined using an air pycnometer based on ASTM-D2856-70.

The polyamide-based resin expanded bead according to the fourth embodiment of the present invention has a surface layer film thickness of preferably 5 to 50 μm, more preferably 5 to 40 μm, and still more preferably 10 to 30 μm. When the surface layer film thickness of the polyamide-based resin expanded bead is within the above range, an internal pressure is easily applied when the expanded bead is pressure-formed, and a expanded bead molded body having excellent secondary expandability can be obtained.

In addition, the expanded bead is less susceptible to breaking during in-mold forming, it is easier to obtain a high-expansion expanded bead molded body, the fusion splicing properties among the expanded beads during in-mold forming are excellent, and the molded body can be formed without setting the forming pressure to be excessively high.

The surface layer film thickness of the polyamide-based resin expanded bead can be measured as follows. First, 30 or more expanded beads are randomly selected. Next, the expanded beads are cut through their center and split into two. In one cross section of each cut expanded bead, four lines are drawn at equal angles from the outermost surface of the expanded bead through the center and until the opposite outermost surface. On the lines, the respective lengths from the outermost surface of the expanded bead to a foam cell positioned outermost of the expanded bead (surface film thickness) is measured, and the arithmetic mean of those values is defined as the average surface film thickness of the expanded beads.

According to the direct expanding method described in the second embodiment of the present invention, a polyamide-based resin expanded bead having excellent heat resistance can be obtained. Therefore, it is preferable to obtain the polyamide-based resin expanded bead according to the fourth embodiment of the present invention by the production method according to the second embodiment of the present invention.

As described in the second embodiment of the present invention, from the viewpoint of obtaining a polyamide-based resin expanded bead having excellent heat resistance, the polyamide-based resin has a melting point (Tm) of preferably 180° C. or higher, more preferably 185° C. or higher, still more preferably 188° C. or higher, and further preferably 190° C. or higher. On the other hand, from the viewpoint that temperature control during expanding is easy, the polyamide-based resin according to the fourth embodiment of the present invention has a melting point (Tm) of preferably 280° C. or lower, more preferably 260° C. or lower, still more preferably 230° C. or lower, and further preferably 225° C. or lower.

When the polyamide-based resin is one polyamide-based resin alone, the melting point of the polyamide-based resin is the melting point of that polyamide-based resin. When the polyamide-based resin is a mixture of two or more polyamide-based resins, or a mixture of a polyamide-based resin and another thermoplastic resin, the melting point of the polyamide-based resin is the melting point of the mixture kneaded with an extruder in advance.

In the present specification, the melting point (Tm) is a value calculated as the peak top temperature of the melting peak of a DSC curve obtained at a heating rate of 10° C./min by heat-flux differential scanning calorimetry based on JIS K7121-1987 employing "when measuring the fusion temperature after performing a certain heat treatment" as the state adjustment of the test piece (the heating rate and the cooling rate in the state adjustment of the test piece are 10° C./min in each case). When the DSC curve has a plurality of melting peaks, the peak top temperature of the melting peak having the largest area is employed as the fusion temperature. The test pieces of the polyamide-based resin and the polyamide-based resin bead were, for example, stored in a desiccator under a nitrogen atmosphere and then vacuum-sucked and stored so as avoid high temperature and high humidity conditions and not become hydrolyzed.

[Polyamide-Based Resin Expanded Bead Molded Body]

An expanded molded body can be obtained by in-mold forming of the polyamide-based resin expanded bead obtained by the present invention. A conventional method may be used for the in-mold forming, and use of heating by steam is preferred. Steam allows the polyamide-based resin in the polyamide-based resin expanded bead to absorb water and become plasticized, so that the forming pressure can be reduced. When the resulting molded body is dried to remove moisture, the original properties of the polyamide-based resin are restored, so that a molded body having a high heat resistance can be obtained.

The polyamide-based resin expanded bead according to the fourth embodiment of the present invention can be used to form an expanded bead molded body having excellent in-mold formability. Specifically, secondary expandability during in-mold forming in order to obtain a molded body is excellent. In addition, this polyamide-based resin expanded bead is preferable because water cooling time can be shortened, and as a result, the overall forming time can be shortened.

The water cooling time of the expanded bead molded body is determined as follows. First, a mold (e.g., length of 200 mm, width of 250 mm, and thickness of 50 mm) is filled with the obtained polyamide-based resin expanded beads, and in-mold forming is performed by steam heating to obtain an expanded bead molded body in a plate form. The heating method is carried out by supplying steam for 5 seconds with the drain valves on both sides of the mold opened for preheating (exhaustion step), then supplying steam from the mold on the moving side, followed by supplying steam from the mold on the stationary side, and then heating to the forming and heating steam pressure (forming pressure=forming vapor pressure). After the heating ends, the pressure is released, and the molded body is cooled with water until the surface pressure due to the foaming force of the molded body decreased to 0.02 MPa (gauge pressure). The mold is then opened and the molded body is removed from the mold. The water cooling time of the expanded bead molded body is taken as the water cooling time (seconds) taken from the start of water cooling until the surface pressure reached 0.02 MPa (gauge pressure).

EXAMPLES

The present invention is described in detail with reference to the following examples, though the present invention is not limited thereto.

Each of the physical properties of the polyamide-based resin, the polyamide-based resin bead, and the polyamide-based resin expanded bead in each example was measured by the following method.

[Measurement Methods]
[Melting Point (Tm)]

The melting point of the polyamide-based resin bead was measured by heat-flux differential scanning calorimetry based on JIS K7121-1987. Heating and melting (first temperature rising) was performed from 30° C. to a temperature 30° C. higher than the temperature at the end of a melting peak at a heating rate of 10° C./min under a nitrogen inflow of 30 mL/min. The temperature was maintained for 10 minutes, then cooling was performed to 30° C. at a cooling rate of 10° C./min, heating and melting were performed again to a temperature 30° C. higher than the temperature at the end of a melting peak at a heating rate of 10° C./min, and the peak top temperature of a melting peak in the resulting DSC curve was calculated. A high-sensitivity differential scanning calorimeter "EXSTAR DSC7020" (manufactured by SII Nano Technology Inc.) was used as the measurement apparatus. Further, the polyamide-based resin beads and the polyamide-based resin that were used to measure the melting point were placed in a desiccator under a nitrogen atmosphere so as not to be hydrolyzed under high temperature and high humidity conditions, and then vacuum sucked to reduce the moisture content to 1000 mass ppm or less and stored for 24 hours.

[Density]

The density was determined based on the method described in ISO 1183-3.

[Flexural Modulus (MPA)]

The flexural modulus of a polyamide-based resin was determined by the measurement in accordance with JIS K7171: 2016. The flexural modulus was measured by preparing a resin test piece having a thickness of 4 mm, a width of 10 mm, and a length of 80 mm and leaving the test piece to stand at a room temperature of 23° C. and a humidity of 50% for 72 hours. The measurement was then performed under conditions of a distance between fulcrums of 64 mm, a radius R of the indenter of 15.0 mm, a radius R of the support of 25.0 mm, a test rate of 2 mm/min, a room temperature of 23° C., and a humidity of 50%, using a testing machine Autograph AGS-10 kNG (manufactured by Shimadzu Corporation). The average of calculated values (at 5 points) was used as the flexural modulus.

The flexural modulus of an amide-based elastomer (manufactured by Arkema S. A., product name "PEBAX 5533", melting point: 159° C., density: 1.01 g/cm$^3$) was measured to be 150 MPa by the method described above.

[Heat of Fusion (Endothermic Energy of High Temperature Peak)]

The heat of fusion was determined from the high temperature peak of a first DSC curve measured when raising the temperature from 30° C. to a temperature 30° C. higher than the temperature at the end of the melting peak at a temperature rising rate of 10° C./min by heat-flux differential scanning calorimetry. A high-sensitivity differential scanning calorimeter "EXSTAR DSC7020" (manufactured by SII Nano Technology Inc.) was used as the measurement apparatus.

The endothermic energy of the high temperature peak of the expanded bead in the present invention corresponds to the area of the high temperature peak b appearing on a higher temperature side than the intrinsic peak a on the DSC curve shown in FIG. 1, and was calculated as follows. First, as shown in FIG. 1, a straight line was drawn connecting the point I at 150° C. on the DSC curve with the point II indicating a fusion end temperature on the DSC curve. Next, the point IV was set at the intersection of the straight line connecting the point I and the point II with the straight line perpendicular to temperature on the horizontal axis of the graph that passed through a point III on the DSC curve corresponding to the valley between the intrinsic peak a and the high temperature peak b. The endothermic energy of the high temperature peak was taken as the area of the portion (hatched portion) enclosed by the straight line connecting the points IV and II, the straight line connecting the points III and IV, and the DSC curve connecting the points III and II.

[Evaluations]

(Apparent Density of Expanded Bead)

A measuring cylinder containing water at a temperature of 23° C. was prepared. The mass W1 of about 500 cm$^3$ of expanded beads that had been left for 2 days at 23° C. and 1 atm under a relative humidity of 50% was measured in the measuring cylinder and sunk into the water using a wire mesh. Considering the volume of the wire mesh, the volume V1 [cm$^3$] of the expanded beads was measured based on the water level rising. The apparent density of the expanded beads was obtained by dividing the mass W1 [g] of the expanded beads by the volume V1, i.e., (W1/V1), and converting the unit into [kg/m$^3$].

[Closed Cell Ratio]

In accordance with a procedure C described in ASTM-D2856-70, the value of true volume Vx of an expanded bead (sum of the volume of resin constituting the expanded bead and the total volume of cells in a portion of closed cells in an expanded bead) was measured. In the measurement of the true volume Vx, an air pycnometer "930" manufactured by Beckman-Toshiba Ltd., was used. Subsequently, the closed cell ratio was calculated by the following formula (1), and the arithmetic average of the 5 times measurement results was determined.

$$\text{Closed cell ratio (\%)} = (Vx - W/\rho) \times 100/(Va - W/\rho) \quad (1)$$

Vx: True volume of expanded bead measured by the above method (cm$^3$)

Va: Apparent volume of expanded bead (cm$^3$)

W: Mass of sample for use in measurement of expanded bead (g)

ρ: Density of resin constituting expanded bead (g/cm$^3$)

Second Embodiment of the Present Invention

Examples 101 and 102

[Production of Polyamide-Based Resin Bead]

An extruder equipped with a die capable of coextruding a large number of multilayer strands on the outlet side was used by combining an extruder for forming a core layer having an inner diameter of 65 mm and an extruder for forming a coating layer having an inner diameter of 30 mm.

The core layer resin 1030B or 5033B shown in Table 1 was supplied to the extruder for forming the core layer, as a foam conditioner, "Talcum Powder PK-S" (manufactured by Hayashi Kasei Co., Ltd.) was added so as to have a content of 3000 mass ppm, and as an end-capping agent, 1 part by mass of "Stabaxol P100", (manufactured by Rhein Chemie Corporation) was supplied. The mixture was melted and kneaded. Further, the coating layer resin 5034B or 6434B shown in Table 1 was supplied to the extruder for forming the coating layer, "Stabaxol P100" (manufactured by Rhein Chemie Corporation) was supplied as an end-capping agent so as to have a content of 1 part by mass, and the mixture was melted and kneaded.

The molten kneaded products were brought together in a die in a mass ratio of core layer/coating layer of 92/8, and coextruded from a small nozzle attached to the tip of the extruder as a multilayer strand having a circular cross section in which the outer peripheral surface of the core layer was coated with the coating layer. The coextruded strand was cooled with water, then cut into pieces having a mass of about 2.0 mg each with a pelletizer and dried to obtain polyamide-based resin beads.

[Production of Polyamide-Based Resin Expanded Bead]

A 400-L autoclave having a stirrer was charged with 10 kg of the obtained polyamide-based resin beads and 310-L of water as dispersion. Further, relative to 100 parts by mass of the polyamide-based resin beads, 3.0 parts by mass of kaolin as dispersant and 0.08 parts by mass of sodium alkylbenzene sulfonate as surfactant were added to the dispersion.

While stirring the contents in an autoclave, the temperature was increased from room temperature (23° C.), and after the impregnation temperature shown in Table 2 was reached, carbon dioxide as blowing agent was injected into the autoclave until the pressure in the autoclave reached the impregnation pressure shown in Table 2. At this time, the heating-up period from room temperature (23° C.) to the impregnation temperature shown in Table 2 was 30 minutes. The temperature rising rate was taken as the average rate obtained by subtracting room temperature (23° C.) from the impregnation temperature shown in Table 2, and dividing by the heating up period. Subsequently, the retention temperature and the retention time and pressure in the retention step shown in Table 2 were maintained.

The polyamide-based resin beads impregnated with the blowing agent were then discharged together with the dispersion under atmospheric pressure (0.1 MPa). The resulting polyamide-based resin expanded beads were cured in an oven at 60° C. for 24 hours and then gradually cooled to obtain polyamide-based resin expanded beads.

Table 2 shows the heat of fusion (J/g), apparent density, and closed cell ratio of the obtained expanded beads.

Examples 103 to 106, 108, 109, and 151 to 158

[Production of Polyamide-Based Resin Bead]

To form a single layer structure, the resin 1030B, 6434B, E2046, or 5033B shown in Table 1 was supplied to the extruder for forming the core layer, as a foam conditioner, "Talcum Powder PK-S" (manufactured by Hayashi Kasei Co., Ltd.) was added so as to have a content of 3000 mass ppm, and as an end-capping agent, 1% by mass of "Stabaxol P100", (manufactured by Rhein Chemie Corporation) was supplied. The mixture was melted and kneaded. The molten kneaded product was extruded from a small nozzle attached to the tip of the extruder as a single layer strand having a circular cross section. The extruded strand was cooled with water, then cut into pieces having a mass of about 2.0 mg each with a pelletizer and dried to obtain polyamide-based resin beads.

Polyamide-based resin expanded beads were obtained under the conditions shown in Tables 2 and 3 in the same manner as in Example 101 except as described above. Tables 2 and 3 show the heat of fusion (J/g), apparent density, and closed cell ratio of the obtained expanded beads.

Example 107

A polyamide-based resin expanded bead was obtained under the conditions shown in Table 2 in the same manner as in Example 103 except that in the production of the polyamide-based resin expanded bead, nitrogen was used as the blowing agent. Table 2 shows the heat of fusion (J/g), apparent density, and closed cell ratio of the obtained expanded bead.

The polyamide-based resin expanded bead obtained in Example 103 was filled in a mold, and then in-mold forming by a pressure forming method was carried out using steam as a heating medium to obtain a polyamide-based resin expanded bead molded body. The crystallite size of the obtained polyamide-based expanded bead molded body was measured to be 7.1 nm.

The crystallite size of the polyamide-based resin expanded bead molded body was determined by the following method. The obtained polyamide-based resin expanded bead molded body was subjected to X-ray diffraction (XRD) analysis by a transmission method using an X-ray scattering apparatus "D8 DISCOVER μHR Hybrid, Bulker" (manufactured by AXS). An imaging plate (IP) was used as the detector. As the sample, a expanded body sliced so that the sample thickness was about 0.6 mm was used. A two-dimensional X-ray diffraction pattern obtained from the IP was converted into a one-dimensional pattern by ring averaging. In addition, empty cell scattering correction was also performed. The one-dimensional X-ray diffraction profile thus obtained was subjected to peak separation into diffraction peaks derived from the crystal and diffraction peaks derived from amorphous material, assuming that the peak shape was given by a Gaussian function. The full width half maximum β (rad) of a peak having the narrowest peak width among the peaks obtained by the peak separation was calculated to determine the crystallite size D of the expanded bead molded body based on the following formula (2) using the full width half maximum β.

$$D = \frac{0.9\lambda}{\sqrt{\beta^2 - b^2}\cos\theta} \qquad (2)$$

TABLE 1

| Abbreviation | Resin composition | Melting point (° C.) | Density (g/cm³) | Flexural modulus (MPa) | Manufacturer | Product name |
|---|---|---|---|---|---|---|
| 1030B | Polyamide 6 (nylon 6) | 220 | 1.14 | 1770 | Ube Industries, Ltd. | Ube Nylon 1030B |
| 5034B | Polyamide 6/66 copolymer (nylon 6/66), Polyamide 6/Polyamide 66 = 80/20 | 193 | 1.14 | 1260 | Ube Industries, Ltd. | Ube Nylon 5034B |
| 5033B | Polyamide 6/66 copolymer (nylon 6/66), Polyamide 6/Polyamide 66 = 85/15 | 197 | 1.14 | 1300 | Ube Industries, Ltd. | Ube Nylon 5033B |
| E2046 | Polyamide 66 (nylon 66) | 259 | 1.14 | 2050 | UNITIKA Ltd. | — |
| 6434B | Polyamide 6/66/12 copolymer (nylon 6/66/12), Polyamide 6/Polyamide 66/Polyamide 12 = 80/20/20 | 186 | 1.12 | 1070 | Ube Industries, Ltd. | Ube Nylon 6434B |
| 1022B | Polyamide 6 (nylon 6) | 220 | 1.14 | 1770 | Ube Industries, Ltd. | Ube Nylon 1022B |

TABLE 2

|  |  |  | Example 101 | Example 102 | Example 103 | Example 104 | Example 105 | Example 106 | Example 107 | Example 108 | Example 109 |
|---|---|---|---|---|---|---|---|---|---|---|---|
| Resin bead |  | Core layer resin | 1030B | 5033B | 5033B | 1030B | 6434B | E2046 | 5033B | 5033B | 5033B |
|  |  | Coating layer resin | 5034B | 6434B | — | — | — | — | — | — | — |
|  |  | Core layer resin/coating layer resin (mass ratio) | 9 | 9 | — | — | — | — | — | — | — |
|  |  | Melting point Tm (° C.) *1 | 220 | 197 | 197 | 220 | 186 | 259 | 197 | 197 | 197 |
|  | End-capping agent | End-capping agent type | Core layer resin | Stabaxol P100 | Stabaxol P100 | Stabaxol P100 | Stabaxol P100 | Stabaxol P100 | Stabaxol P100 | Stabaxol P100 | Stabaxol P100 | Stabaxol P100 |
|  |  |  | Coating layer resin | Stabaxol P100 | Stabaxol P100 | — | — | — | — | — | — | — |
|  |  | Added amount of end-capping agent *2 | Core layer resin (parts by mass) | 1 | 1 | 1 | 1 | 1 | 1 | 1 | 1 | 1 |
|  |  |  | Coating layer resin (parts by mass) | 1 | 1 | — | — | — | — | — | — | — |
| Expanded bead | Production conditions | Blowing agent type | | $CO_2$ | $CO_2$ | $CO_2$ | $CO_2$ | $CO_2$ | $CO_2$ | $N_2$ | $CO_2$ | $CO_2$ |
|  |  | Impregnation step | Impregnation temperature (° C.) | 158.4 | 135.0 | 136.0 | 158.0 | 132.0 | 176.0 | 134.0 | 136.0 | 136.0 |
|  |  |  | Impregnation pressure (MPa [G]) | 4.0 | 4.0 | 4.0 | 4.0 | 4.0 | 4.0 | 4.0 | 4.0 | 4.0 |
|  |  | Retention step | Retention time (min) | 15 | 15 | 15 | 15 | 15 | 15 | 15 | 3 | 30 |
|  |  |  | Retention temperature (° C.) | 158.4 | 135.0 | 136.0 | 158.0 | 132.0 | 176.0 | 134.0 | 136.0 | 136.0 |
|  |  |  | Tm - retention temperature (° C.) | 61.6 | 62.0 | 61.0 | 62.0 | 54.0 | 83.0 | 63.0 | 61.0 | 61.0 |
|  |  |  | Pressure (MPa [G]) | 4.0 | 4.0 | 4.0 | 4.0 | 4.0 | 4.0 | 4.0 | 4.0 | 4.0 |
|  |  | Expanding step | Temperature Te (° C.) of dispersion immediately before expanding | 158.4 | 135.0 | 136.0 | 158.0 | 132.0 | 176.0 | 134.0 | 136.0 | 136.0 |
|  |  |  | Tm-Te (° C.) | 61.6 | 62.0 | 61.0 | 62.0 | 54.0 | 83.0 | 63.0 | 61.0 | 61.0 |
|  |  |  | Expanding pressure (MPa [G]) | 4.0 | 4.0 | 4.0 | 4.0 | 4.0 | 4.0 | 4.0 | 4.0 | 4.0 |
|  | Physical property | Total heat of fusion (J/g) *3 | | 83 | 53 | 62 | 86 | 57 | 122 | 63 | 59 | 62 |
|  |  | Heat of fusion (J/g) of high temperature peak | | 17 | 15 | 10 | 16 | 6 | 42 | 10 | 12 | 13 |
|  |  | Ratio (%) of heat of fusion of high temperature peak to total heat of fusion | | 21 | 28 | 16 | 19 | 11 | 34 | 16 | 20 | 21 |
|  |  | Apparent density (kg/m³) | | 81 | 180 | 140 | 100 | 195 | 179 | 224 | 149 | 288 |
|  |  | Closed cell ratio (%) | | 91 | 94 | 90 | 90 | 90 | 93 | 90 | 91 | 91 |

*1: Among the polyamide based resin beads, peak top temperature of melting peak having the largest area in the DSC curve
*2: The added amount of the end-capping agent is the added amount (parts by mass) relative to 100 parts by mass of the resin constituting each layer
*3: Heat of fusion obtained by summing heat of fusion of intrinsic peak and heat of fusion of high temperature peak

TABLE 3

|  |  |  | Example 151 | Example 152 | Example 153 | Example 154 | Example 155 | Example 156 | Example 157 | Example 158 |
|---|---|---|---|---|---|---|---|---|---|---|
| Resin bead |  | Core layer resin | 1030B | 1030B | 5033B | 5033B | 5033B | 5033B | 5033B | 5033B |
|  |  | Coating layer resin | — | — | — | — | — | — | — | — |
|  |  | Core layer resin/coating layer resin (mass ratio) | — | — | — | — | — | — | — | — |
|  |  | Melting point Tm (° C.) *1 | 220 | 220 | 197 | 197 | 197 | 197 | 197 | 197 |
|  | End-capping agent | End-capping agent type | Core layer resin | Stabaxol P100 | Stabaxol P100 | Stabaxol P100 | Stabaxol P100 | Stabaxol P100 | Stabaxol P100 | Stabaxol P100 | Stabaxol P100 |
|  |  |  | Coating layer resin | — | — | — | — | — | — | — | — |
|  |  | Added amount of end-capping agent *2 | Core layer resin (parts by mass) | 1 | 1 | 1 | 1 | 1 | 1 | 1 | 1 |
|  |  |  | Coating layer resin (parts by mass) | — | — | — | — | — | — | — | — |

TABLE 3-continued

|  |  |  |  | Example 151 | Example 152 | Example 153 | Example 154 | Example 155 | Example 156 | Example 157 | Example 158 |
|---|---|---|---|---|---|---|---|---|---|---|---|
| Expanded bead | Production conditions | Impregnation step | Blowing agent type | $CO_2$ | $CO_2$ | $CO_2$ | $CO_2$ | $CO_2$ | $CO_2$ | $CO_2$ | $CO_2$ |
|  |  |  | Impregnation temperature (° C.) | 129.0 | 171.0 | 106.0 | 148.0 | 136.0 | 136.0 | 136.0 | 136.0 |
|  |  |  | Impregnation pressure (MPa [G]) | 4.0 | 4.0 | 4.0 | 4.0 | 4.0 | 4.0 | 4.0 | 4.0 |
|  |  | Retention step | Retention time (min) | 15 | 15 | 15 | 15 | 0 | 100 | 15 | 15 |
|  |  |  | Retention temperature (° C.) | 120 | 180 | 97 | 157 | — | 136 | 197 | 136 |
|  |  |  | Tm − retention temperature (° C.) | 100.0 | 40.0 | 100.0 | 40.0 | — | 61.0 | 0.0 | 61.0 |
|  |  |  | Pressure (MPa [G]) | 4.0 | 4.0 | 4.0 | 4.0 | — | 4.0 | 4.0 | 4.0 |
|  |  | Expanding step | Temperature Te (° C.) of dispersion immediately before expanding | 120.0 | 180.0 | 97.0 | 157.0 | 136.0 | 136.0 | 136.0 | 197.0 |
|  |  |  | Tm−Te (° C.) | 100.0 | 40.0 | 100.0 | 40.0 | 61.0 | 61.0 | 61.0 | 0.0 |
|  |  |  | Expanding pressure (MPa [G]) | 4.0 | 4.0 | 4.0 | 4.0 | 4.0 | 4.0 | 4.0 | 4.0 |
|  | Physical property |  | Total heat of fusion (J/g) *3 | 45 | 44 | 41 | 40 | 61 | 42 | 60 | 43 |
|  |  |  | Heat of fusion (J/g) of high temperature peak | — | — | — | — | 7 | 20 | — | — |
|  |  |  | Ratio (%) of heat of fusion of high temperature peak to total heat of fusion | — | — | — | — | 11 | 48 | — | — |
|  |  |  | Apparent density (kg/m³) | 1120 | — | 1120 | — | 204 | 509 | — | — |
|  |  |  | Closed cell ratio (%) | — | — | — | — | 76 | 83 | — | — |

*1: Among the polyamide-based resin beads, peak top temperature of melting peak having the largest area in the DSC curve
*2: The added amount of the end-capping agent is the added amount (parts by mass) relative to 100 parts by mass of the resin constituting each layer
*3: Heat of fusion obtained by summing heat of fusion of intrinsic peak and heat of fusion of high temperature peak From the evaluation results shown in Table 2, it can be seen that in Examples 101 to 109, the polyamide-based resin beads can be expanded at a temperature equal to or higher than 90° C. lower and less than 50° C. lower than the melting point, and a polyamide-based resin expanded bead having a low apparent density can be obtained. Therefore, according to the method for producing a polyamide-based resin expanded bead of the second embodiment of the present invention, a polyamide-based resin bead can be expanded at a temperature equal to or higher than 90° C. lower and less than 50° C. lower than the melting point, and an expanded bead capable of forming an expanded molded body having excellent heat resistance and a complex three-dimensional shape can be obtained relatively easily.

From the evaluation results shown in Table 3, it can be seen that in Examples 151 and 153, in which the retention temperature and the dispersion temperature immediately before expanding were about 100° C. lower than the melting point, the polyamide-based resin beads were in a resin bead state and had hardly expanded.

Further, in Examples 152 and 154, in which the retention temperature and the dispersion temperature immediately before expanding were 40° C. lower than the melting point, the resin beads fused in the vessel when raising the temperature to the retention temperature, so the experiment was halted before the retention temperature was reached.

In Example 155, in which a retention time was not provided, the expanded bead had a low closed cell ratio. It is noted that with the production conditions of Example 155, the heat of fusion of the high temperature peak was 7 J/g, but if the total time of the step of obtaining the dispersion and the step of impregnating the blowing agent was further shortened, it is considered that the value of the heat of fusion of the high temperature peak would approach 0.

Further, in Example 156, in which the retention time was 100 minutes, the expanded bead had a high apparent density and a low closed cell ratio. In addition, it is considered that the polyamide resin was hydrolyzed as a result of retaining it for a long time, and the expanded bead exhibited yellowing.

In Example 157, in which the retention temperature was set to the same temperature as the melting point of the polyamide-based resin, the resin bead fused in the vessel as is when raising the temperature to the retention temperature, so the experiment was halted before the retention temperature was reached. When the high temperature peak was measured for the resin bead fused in the vessel of Example 157, the heat of fusion of the high temperature peak was 0 J/g.

In Example 158, in which the temperature of the dispersion immediately before expanding was set to the same temperature as the melting point of the polyamide-based resin, the resin bead fused in the vessel when raising the temperature to the temperature of the dispersion immediately before expanding, so the experiment was halted before the expanding temperature was reached.

First Embodiment of the Present Invention

Examples 201 to 204, 252, and 253

[Production of Polyamide-Based Resin Bead]

A resin shown in Tables 1 and 4 was supplied to the extruder, as a foam conditioner, "Talcum Powder PK-S" (manufactured by Hayashi Kasei Co., Ltd.) was added so as to have a content of 3000 mass ppm, and the end-capping agent shown in Table 4 was supplied. The mixture was melted and kneaded. The molten kneaded product was extruded from a small nozzle attached to the tip of the extruder as a single layer strand having a circular cross section. The extruded strand was cooled with water, then cut into pieces having a mass of about 2.0 mg each with a pelletizer and dried to obtain polyamide-based resin beads.

[Production of Polyamide-Based Resin Expanded Bead]

A 400-L autoclave having a stirrer was charged with 10 kg of the obtained polyamide-based resin beads and 310-L of water as dispersion. Further, relative to 100 parts by mass of the polyamide-based resin beads, 3.0 parts by mass of kaolin as dispersant and 0.08 parts by mass of sodium alkylbenzene sulfonate as surfactant were added to the dispersion. While stirring the contents in an autoclave, the temperature was increased from room temperature (23° C.), and after the impregnation temperature shown in Table 4 was reached, carbon dioxide as blowing agent was injected into the autoclave until the pressure in the autoclave reached the impregnation pressure shown in Table 4. At this time, the heating-up period from room temperature (23° C.) to the impregnation temperature shown in Table 4 was 30 minutes. The temperature rising rate was taken as the average rate obtained by subtracting room temperature (23° C.) from the impregnation temperature shown in Table 4, and dividing by the heating up period. Subsequently, the retention temperature and the retention time and pressure in the retention step shown in Table 4 were maintained.

The polyamide-based resin beads impregnated with the blowing agent were then discharged together with the dispersion under atmospheric pressure (0.1 MPa). The resulting polyamide-based resin expanded beads were cured in an oven at 60° C. for 24 hours and then gradually cooled to obtain polyamide-based resin expanded beads.

Example 251

[Production of Polyamide-Based Resin Bead]

Polyamide-based resin beads were obtained in the same manner as in Example 201.

[Production of Polyamide-Based Resin Expanded Bead]

The obtained polyamide-based resin beads were placed in a 10° C. autoclave, and left to stand in a carbon dioxide atmosphere of 4.0 MPa for 3 hours to impregnate the polyamide-based resin beads with carbon dioxide. The beads were taken out, placed in a hot air foamer, and 240° C. hot air was blown for 20 seconds to obtain polyamide-based resin expanded beads.

The heat of fusion (J/g), apparent density, closed cell ratio, and 50%-compressive stress at melting point of the expanded beads obtained in Examples 201 to 204 and 251 to 253 were measured. The results are shown in Table 4.

[50%-Compressive Stress at Melting Point of Expanded Bead]

The 50%-compressive stress was determined by measurement of the expanded bead using a thermal analysis apparatus (TMA; "TMA 7100" manufactured by Hitachi High-Tech Science Corporation) in compression mode (tip diameter of compression probe: 3.5 mm). Specifically, one expanded bead randomly selected was held in the minor axis direction of the expanded bead under a load of 1 mN with a compression probe, and heated to the melting point of the raw material resin. Then, while retaining the temperature at the melting point of the raw material resin, the load was increased at a speed of 30 mN/min, and the pressing depth of the probe (amount of displacement) is monitored. The compressive stress at the point when the thickness of the expanded bead reaches 50% of the thickness of the expanded bead before compression is defined as the 50%-compressive stress at melting point of the expanded bead. The procedure was repeated three times, and the arithmetic average thereof was defined as the 50%-compressive stress.

[Production of Polyamide-Based Resin Expanded Bead Molded Body]

Next, an expanded bead molded body was produced using the polyamide-based resin expanded beads.

First, a plate-forming mold having a length of 200 mm, a width of 250 mm and a thickness of 50 mm was filled with the obtained polyamide-based resin expanded beads, and in-mold forming was performed by steam heating to obtain an expanded bead molded body in a plate form. The heating method was carried out by supplying steam for 5 seconds with the drain valves on both sides of the mold opened for preheating (exhaustion step), then supplying steam from the mold on the moving side, followed by supplying steam from the mold on the stationary side, and then heating to the forming and heating steam pressure (forming pressure=forming vapor pressure).

After the heating ended, the pressure was released, and the molded body was cooled with water until the surface pressure due to the expanding force of the molded body decreased to 0.02 MPa (gauge pressure). The mold was then opened and the molded body was removed from the mold. The obtained molded body was cured in an oven at 80° C. for 12 hours and then gradually cooled to room temperature, to thereby obtain a polyamide expanded bead molded body.

The following measurements were carried out on the expanded bead molded bodies obtained in Examples 201 to 204 and 251 to 253. The results are shown in Table 4.

(Resiliency)

The thicknesses of an end portion (10 mm inside from the end) and a central portion (portion equally dividing in the longitudinal direction and in the cross direction) of the expanded bead molded body corresponding to the dimensions of the mold in a plate shape used in the in-mold forming were measured. Subsequently, a thickness ratio of the expanded bead molded body ((Thickness of central portion of the molded body)/(Thickness of the end portion of the molded body)×100(%)) was calculated for evaluation as follows.

A: Thickness ratio is 90% or more.
C: Thickness ratio is less than 90%.

(Secondary Expandability)

The secondary expandability of an expanded bead molded body were evaluated as follows.

A: The gap between expanded beads at the surface of a molded body is completely filled.
C: The gap between expanded beads at the surface of a molded body is unfilled.

(Fusion Splicing Properties)

The fusion ratio of the molded body was determined based on the ratio of the number of expanded beads in which the material failure is occurred among the expanded beads exposed on a fracture surface when the expanded bead molded body was fractured. Specifically, first, a test piece (100 mm length×100 mm width×thickness: thickness of the molded body) was cut out from the expanded bead molded body, a notch of about 5 mm was cut in the thickness direction of each test piece with a cutter knife, and the test piece was fractured from the notch. Next, a number (n) of expanded beads present on the fracture surface of the expanded bead molded body and a number (b) of expanded beads in which the material failure had occurred were measured, and the fusion ratio (%) was taken as the ratio (b/n) between (b) and (n) expressed as a percentage.

(50%-Compressive Stress at Melting Point of Expanded Bead Molded Body)

A 5 mm-square sample was randomly cut out from the expanded bead molded body so as to avoid including the surface of the molded body. Using a thermal analysis apparatus (TMA; "TMA 7100" manufactured by Hitachi High-Tech Science Corporation), the sample was sandwiched by a 1 mN load in compression mode (tip diameter of compression probe: 3.5 mm), and the temperature was then raised to the melting point of the raw material resin.

Then, while retaining the temperature at the melting point of the raw material resin, the load was increased at a speed of 30 mN/min. The stress at the point when the thickness of the expanded bead molded body reached 50% of the thickness of the expanded bead molded body before compression was determined.

TABLE 4

| | | | | Example 201 | Example 202 | Example 203 | Example 204 | Example 251 | Example 252 | Example 253 |
|---|---|---|---|---|---|---|---|---|---|---|
| Resin | | | Resin | 5033B | 1030B | 6434B | 5033B | 5033B | 5033B | 1030B |
| | | | Melting point Tm (°C.) *1 | 197 | 220 | 186 | 197 | 197 | 197 | 220 |
| | | | MFR (g/10min) | 3.5 | 2.8 | 3.1 | 3.5 | 3.5 | 3.5 | 2.8 |
| | End-capping agent | | End-capping agent type | Stabaxol P | Stabaxol P | Stabaxol P | none | Stabaxol P | Stabaxol P | Stabaxol P |
| | | | Added amount of end-capping agent (parts by mass) *2 | 1 | 1 | 1 | 0 | 1 | 1 | 1 |
| Expanded bead | Production conditions | | Blowing agent type | $CO_2$ | $CO_2$ | $CO_2$ | $CO_2$ | $CO_2$ | $CO_2$ | $CO_2$ |
| | | | Foaming method | direct | direct | direct | direct | impregnation | direct | direct |
| | Production conditions | Impregnation step | Impregnation temperature (° C.) | 136.0 | 158.0 | 132.0 | 136.0 | 10.0 | 136.0 | 157.0 |
| | | | Impregnation pressure (MPa [G]) | 4.0 | 4.0 | 4.0 | 4.0 | 4.0 | 4.0 | 4.0 |
| | | Retention step | Retention time (min) | 15 | 15 | 15 | 15 | 180 | 15 | 15 |
| | | | Retention temperature (° C.) | 136.0 | 158.0 | 132.0 | 136.0 | 10.0 | 136.0 | 157.0 |
| | | | Tm - retention temperature (° C.) | 61.0 | 62.0 | 54.0 | 61.0 | 187.0 | 61.0 | 63.0 |
| | | | Pressure (MPa [G]) | 4.0 | 4.0 | 4.0 | 4.0 | 4.0 | 4.0 | 4.0 |
| | | Expanding step | Temperature Te (° C.) of dispersion immediately before expanding | 136.0 | 158.0 | 132.0 | 136.0 | 240.0 | 136.0 | 157.0 |
| | | | Tm-Te (° C.) | 61.0 | 62.0 | 54.0 | 61.0 | −43.0 | 61.0 | 63.0 |
| | | | Expanding pressure (MPa [G]) | 4.0 | 4.0 | 4.0 | 4.0 | 0.0 | 4.0 | 4.0 |
| | Physical property | DSC curve in first heating | Low temperature side heat of fusion (J/g) | 41 | 61 | 42 | 50 | 32 | 38 | 49 |
| | | | Low temperature side fusion temperature (° C.) | 191 | 220 | 182 | 191 | 188 | 193 | 219 |
| | | | High temperature side heat of fusion (J/g) | 13 | 13 | 9 | 12 | 0 | 3 | 42 |
| | | | High temperature side fusion temperature (° C.) | 211 | 231 | 201 | 211 | — | 211 | 230 |
| | | | Difference between intrinsic peak temperature and high temperature peak temperature (° C.) | 20 | 12 | 19 | 20 | — | 18 | 11 |
| | | | Total heat of fusion (J/g) *3 | 54 | 74 | 51 | 62 | 32 | 41 | 91 |
| | | | Ratio (%) of heat of fusion of high temperature peak to total heat of fusion | 24 | 18 | 19 | 19 | 0 | 7 | 46 |
| | | DSC curve in second heating | Total heat of fusion (J/g) | 36 | 65 | 41 | 36 | 37 | 38 | 59 |
| | | | Fusion temperature (° C.) | 191 | 217 | 182 | 191 | 191 | 191 | 217 |
| | | | Ratio of first total amount of heat with respect to second total amount of heat | 1.5 | 1.1 | 1.3 | 1.7 | 0.9 | 1.1 | 1.5 |
| | | | Apparent density (kg/m³) | 140 | 90 | 114 | 110 | 860 | 230 | 410 |
| | | | Closed cell ratio (%) | 94 | 92 | 95 | 94 | 35 | 75 | 91 |
| | | | 50%-Compressive stress (kPa) at melting point | 10 | 15 | 8 | 8 | 1 | 1 | 16 |
| Expanded bead molded body | Physical property | Formability | Resiliency | A | A | A | A | A | C | — |
| | | | Secondary expandability | A | A | A | A | C | C | — |
| | | | Fusion splicing property | 90 | 90 | 90 | 90 | 20 | 10 | — |
| | | | 50%-Compressive stress (kPa) at melting point | 15 | 25 | 12 | 13 | 1 | 1 | — |

*1: Among the polyamide-based resin beads, peak top temperature of melting peak having the largest area in the DSC curve
*2: The added amount of the end-capping agent is the added amount (parts by mass) relative to 100 parts by mass of the resin
*3: Heat of fusion obtained by summing heat of fusion of intrinsic peak and heat of fusion of high temperature peak From the results shown in Table 4, it can be seen that the 50%-compressive stress at the melting point of the polyamide-based resin expanded beads obtained in Examples 201 to 204 was 8 to 15 kPa. The expanded bead molded bodies obtained by using such polyamide-based resin expanded beads had excellent formability and excellent compressive strength at high temperature. Therefore, according to the first embodiment of the present invention, it is possible to provide a polyamide-based resin expanded bead having excellent compressive strength at high temperature.

On the other hand, in Example 251 in which the expanded beads were obtained by an impregnation expanding method, the expanded beads did not have a high temperature peak, and the compressive strength at high temperature was insufficient. Further, in Example 252, even when expanded beads were obtained by a direct expanding method, it was shown that the compressive strength at high temperature was insufficient when the high temperature peak ratio was low. In addition, in Example 253, even when the expanded beads are obtained by the direct expanding method, when the high temperature peak ratio was too high, the apparent density increased when the expanded beads were obtained from the resin beads, the fusion splicing properties and secondary expandability during in-mold forming were insufficient, formability was poor, and it was difficult to obtain a molded body.

Third Embodiment of the Present Invention

Examples 301 to 303 and 351

[Production of Polyamide-Based Resin Bead]

An extruder equipped with a die capable of coextruding a large number of multilayer strands on the outlet side was used by combining an extruder for forming a core layer having an inner diameter of 65 mm and an extruder for forming a coating layer having an inner diameter of 30 mm.

The core layer resin shown in Table 1 and Table 5 was supplied to the extruder for forming the core layer, as a foam conditioner, "Talcum Powder PK-S" (manufactured by Hayashi Kasei Co., Ltd.) was added so as to have a content of 3000 mass ppm, and 1 part by mass of the end-capping agent shown in Table 5 was supplied. The mixture was melted and kneaded. Further, the coating layer resin shown in Table 1 and Table 5 was supplied to the extruder for forming the coating layer, the end-capping agent shown in Table 5 was supplied so as to have a content of 1 part by mass, and the mixture was melted and kneaded.

The molten kneaded products were brought together in a die in the mass ratio of core layer/coating layer shown in Table 5, and coextruded from a small nozzle attached to the tip of the extruder as a multilayer strand having a circular cross section in which the outer peripheral surface of the core layer was coated with the coating layer. The coextruded strand was cooled with water, then cut into pieces having a mass of about 2.0 mg each with a pelletizer and dried to obtain polyamide-based resin beads.

[Production of Polyamide-Based Resin Expanded Bead]

A 400-L autoclave having a stirrer was charged with 10 kg of the obtained polyamide-based resin beads and 310-L of water as dispersion. Further, relative to 100 parts by mass of the polyamide-based resin beads, 3.0 parts by mass of kaolin as dispersant and 0.08 parts by mass of sodium alkylbenzene sulfonate as surfactant were added to the dispersion.

While stirring the contents in an autoclave, the temperature was increased from room temperature (23° C.), and after the impregnation temperature shown in Table 5 was reached, carbon dioxide as blowing agent was injected into the autoclave until the pressure in the autoclave reached the impregnation pressure shown in Table 5. At this time, the heating-up period from room temperature (23° C.) to the impregnation temperature shown in Table 5 was 30 minutes. The temperature rising rate was taken as the average rate obtained by subtracting room temperature (23° C.) from the impregnation temperature shown in Table 5, and dividing by the heating up period. Subsequently, the retention temperature and the retention time and pressure in the retention step shown in Table 5 were maintained.

The polyamide-based resin beads impregnated with the blowing agent were then discharged together with the dispersion under atmospheric pressure (0.1 MPa). The resulting polyamide-based resin expanded beads were cured in an oven at 60° C. for 24 hours and then gradually cooled to obtain polyamide-based resin expanded beads.

Examples 352 and 353

[Production of Polyamide-Based Resin Bead]

To form a single layer structure, a resin shown in Table 1 and Table 5 was supplied to the extruder for forming the core layer, as a foam conditioner, "Talcum Powder PK-S" (manufactured by Hayashi Kasei Co., Ltd.) was added so as to have a content of 3000 mass ppm, and 1% by mass of the end-capping agent shown in Table 5 was supplied. The mixture was melted and kneaded. The molten kneaded product was extruded from a small nozzle attached to the tip of the extruder as a single layer strand having a circular cross section. The extruded strand was cooled with water, then cut into pieces having a mass of about 2.0 mg each with a pelletizer and dried to obtain polyamide-based resin beads.

Polyamide-based resin expanded beads were obtained under the conditions shown in Table 5 in the same manner as in Examples 301 or 303 except as described above.

(Preparation of Measurement Sample of Melting Point of Coating Layer and Core Layer)

In the third embodiment of the present invention, the melting point (Tms) of coating layer and the melting point (Tmc) of the core layer were obtained by preparing a measurement sample based on the method described below, and measuring the heat of fusion of the measurement sample based on heat-flux differential scanning calorimetry in accordance with the above-mentioned condition 1. The measurement samples for measuring the crystallinity of the coating layer and the core layer were also prepared in the same way.

[Preparation of Measurement Sample]

(Heat of Fusion Measurement Sample of Expanded Bead Coating Layer)

Surface layer portions including the surface of the expanded bead were cut and gathered together to make a test piece. In the cutting process, a measurement sample having a mass of ⅒ of the bead mass of the expanded bead before the cutting process was collected from the whole surface of one expanded bead. The cutting process was performed on a plurality of expanded beads, and a measurement sample of about 2 g was collected.

(Heat of Fusion Measurement Sample of Expanded Bead Core Layer)

The whole surface of the expanded bead was cut off and removed, and the remaining part of the expanded bead, which had a mass of ⅓ of the bead mass of the expanded bead before the cutting process, was collected as a measurement sample. The cutting process was performed on a plurality of expanded beads, and a measurement sample of about 2 g was collected.

[Total Heat of Fusion in Core Layer and Coating Layer]

The total heat of fusion in each of the core layer and the coating layer of the polyamide-based resin expanded bead was calculated as follows. The DSC curve measured based on heat-flux differential scanning calorimetry in accordance with JIS K7122-1987 when each measurement sample obtained by the above adjustments was heated and melted from 30° C. to a temperature 30° C. higher than a temperature at the end of a melting peak at a heating rate of 10° C./min was defined as a first DSC curve. For the first DSC curve, the amount of heat of the exothermic peak and the endothermic peak at the time of temperature rise was obtained, and the total amount of heat was obtained by subtracting the amount of heat of the exothermic peak from the amount of heat of the endothermic peak.

[Crystallinity Calculation Method]

The crystallinity of the core layer and the coating layer of the polyamide-based resin expanded beads was determined by dividing the respective total amount of heat obtained above by the perfect crystal heat quantity of 230 J/g in the case of the nylon 6-based resins (1030B, 5034B, 5033B, 6434B, and 1022B) and by the perfect crystal heat quantity of 226 J/g in the case of the nylon 66-based resin (E2046), and multiplying by 100.

The following measurements were carried out on the expanded bead molded bodies obtained in Examples 301 to 303 and 351 to 353. The results are shown in Table 5.

(Fusion Ratio)

The fusion ratio of the expanded bead molded body was determined based on the ratio of the number of expanded beads in which the material failure was occurred among the expanded beads exposed on a fracture surface when the expanded bead molded body was fractured. Specifically, first, a test piece (100 mm length×100 mm width×thickness: thickness of the molded body) was cut out from the expanded bead molded body, a notch of about 5 mm was cut in each test piece with a cutter knife, and the test piece was fractured from the notch. Next, a number (n) of expanded beads present on the fracture surface of the expanded bead molded body and a number (b) of expanded beads in which the material failure had occurred were measured, and the fusion ratio (%) was taken as the ratio (b/n) between (b) and (n) expressed as a percentage. This procedure was repeated on five test pieces, and the arithmetic mean value thereof was defined as the fusion ratio (%).

(Heat Resistance)

A 5 mm-square sample was randomly cut out from the expanded bead molded body so as to avoid including the surface of the molded body. Using a thermal analysis apparatus (TMA; "TMA 7100" manufactured by Hitachi High-Tech Science Corporation), the sample was compressed under a high temperature condition in compression mode (tip diameter of compression probe: 3.5 mm). Specifically, with an initial load set to 500 mN and the temperature of the probe raised from 30° C. to 250° C. at a rate of 5° C./min, the indentation depth (amount of displacement) of the probe was monitored, and temperature when the thickness of the sample was compressed by 5% with respect to the thickness of the sample before the test was determined.

A: 5%-Compressive temperature of 190° C. or higher
B: 5%-Compressive temperature of 160° C. or higher and lower than 190° C.

TABLE 5

| | | | | Example 301 | Example 302 | Example 303 | Example 351 | Example 352 | Example 353 |
|---|---|---|---|---|---|---|---|---|---|
| Resin bead | | Core layer resin | | 1030B | E2046 | 5034B | 1030B | 1030B | 5034B |
| | | Core layer melting point (° C.) | | 220 | 259 | 193 | 220 | 220 | 193 |
| | | Coating layer resin | | 5034B | 5034B | 6434B | 1022B | — | — |
| | | Coating layer melting point (° C.) | | 193 | 193 | 186 | 220 | — | — |
| | | Core layer resin/coating layer resin (mass ratio) | | 9 | 9 | 9 | 10 | — | — |
| | | Difference (° C.) in melting point between coating layer and core layer | | 27 | 66 | 7 | 0 | — | — |
| | | Melting point Tm (° C.) *1 | | 220 | 259 | 197 | 220 | 220 | 193 |
| | End-capping agent | End-capping agent type | Core layer resin | Stabaxol P | Stabaxol P100 | Stabaxol P | Stabaxol P | Stabaxol P | Stabaxol P |
| | | | Coating layer resin | Stabaxol P | Stabaxol P100 | Stabaxol P | Stabaxol P | — | — |
| | | Added amount of end-capping agent *2 | Core layer resin (parts by mass) | 1 | 1 | 1 | 1 | 1 | 1 |
| | | | Coating layer resin (parts by mass) | 1 | 1 | 1 | 1 | — | — |
| Expanded bead | Production conditions | Blowing agent type | | $CO_2$ | $CO_2$ | $CO_2$ | $CO_2$ | $CO_2$ | $CO_2$ |
| | | Impregnation step | Impregnation temperature (° C.) | 158.4 | 176.5 | 130.5 | 158.4 | 158.4 | 130.5 |
| | | | Impregnation pressure (MPa [G]) | 4.0 | 4.0 | 4.0 | 4.0 | 4.0 | 4.0 |
| | | Retention step | Retention time (min) | 15 | 15 | 15 | 15 | 15 | 15 |
| | | | Retention temperature (° C.) | 158.4 | 176.5 | 130.5 | 158.4 | 158.4 | 130.5 |
| | | | Tm - retention temperature (° C.) | 61.6 | 82.5 | 62.5 | 61.6 | 61.6 | 62.5 |
| | | | Pressure (MPa [G]) | 4.0 | 4.0 | 4.0 | 4.0 | 4.0 | 4.0 |
| | | Expanding step | Temperature Te (° C.) of dispersion immediately before expanding | 158.4 | 176.5 | 130.5 | 158.4 | 158.4 | 130.5 |
| | | | Tm-Te (° C.) | 61.6 | 82.5 | 62.0 | 61.6 | 61.6 | 62.0 |
| | | | Expanding pressure (MPa [G]) | 4.0 | 4.0 | 4.0 | 4.0 | 4.0 | 4.0 |
| | | Total heat of fusion (J/g) *3 | | 83 | 71 | 57 | 80 | 83 | 57 |
| | | Heat of fusion (J/g) of high temperature peak | | 17 | 30 | 10 | 16 | 19 | 10 |
| | | Ratio (%) of heat of fusion of high temperature peak to total heat of fusion | | 21 | 43 | 18 | 20 | 23 | 18 |

TABLE 5-continued

|  |  |  | Example 301 | Example 302 | Example 303 | Example 351 | Example 352 | Example 353 |
|---|---|---|---|---|---|---|---|---|
|  | Physical property | Total heat of fusion (J/g) in core layer | 69 | 72 | 51 | 60 | 58 | 48 |
|  |  | Total heat of fusion (J/g) in coating layer | 55 | 60 | 46 | 60 | — | — |
|  |  | Apparent density (kg/m³) | 81 | 88 | 109 | 90 | 80 | 115 |
|  |  | Closed cell ratio (%) | 95 | 90 | 94 | 91 | 93 | 92 |
|  |  | Crystallinity (%) of core layer | 30 | 32 | 22 | 26 | 25 | 21 |
|  |  | Crystallinity (%) of coating layer | 24 | 26 | 20 | 26 | — | — |
| Molded body | Production conditions | Forming pressure (MPa) | 0.46 | 0.46 | 0.16 | 0.46 | 0.46 | 0.16 |
|  | Formability | Fusion ratio (%) | 90 | 90 | 90 | 20 | 20 | 60 |
|  | Heat resistance | 5%-Compression temperature | 212 | 240 | 186 | 210 | 206 | 180 |
|  |  | Evaluation | A | A | B | A | A | B |

*1: Among the polyamide-based resin beads, peak top temperature of melting peak having the largest area in the DSC curve
*2: The added amount of the end-capping agent is the added amount (parts by mass) relative to 100 parts by mass of the resin constituting each layer
*3: Heat of fusion obtained by summing heat of fusion of intrinsic peak and heat of fusion of high temperature peak From the results shown in Table 5, it can be seen that the expanded bead molded bodies obtained using the polyamide-based resin expanded beads obtained in Examples 301 to 303 had a high fusion ratio of 90% or more and excellent heat resistance. Therefore, according to the third embodiment of the present invention, it is possible to provide a polyamide-based resin expanded bead having excellent fusion splicing properties while maintaining high heat resistance.

On the other hand, in Example 351, even for the resin beads having a core layer and a coating layer, poor fusion splicing properties were exhibited when there was no difference between the melting point of the core layer and the melting point of the coating layer. Further, in Example 352, the resin beads using a polyamide resin having a high melting point in a single layer exhibited poor fusion splicing properties, and in Example 353, although the resin beads using a polyamide resin having a low melting point in a single layer has slightly better fusion splicing properties, the fusion splicing properties were still insufficient.

Fourth Embodiment of the Present Invention

Examples 411 to 414 and 471

[Production of Polyamide-Based Resin Bead]

A resin shown in Tables 1 and 6 was supplied to the extruder, and as a foam conditioner, "Talcum Powder PK-S" (manufactured by Hayashi Kasei Co., Ltd.) was added in the amount shown in Table 6. The mixture was melted and kneaded. The molten kneaded product was extruded from a small nozzle attached to the tip of the extruder as a single layer strand having a circular cross section. The extruded strand was cooled with water, then cut into pieces having a mass of about 2.0 mg each with a pelletizer and dried to obtain polyamide-based resin beads.

[Production of Polyamide-Based Resin Expanded Bead]

A 400-L autoclave having a stirrer was charged with 10 kg of the obtained polyamide-based resin beads and 310-L of water as dispersion. Further, relative to 100 parts by mass of the polyamide-based resin beads, 3.0 parts by mass of kaolin as dispersant and 0.08 parts by mass of sodium alkylbenzene sulfonate as surfactant were added to the dispersion.

While stirring the contents in an autoclave, the temperature was increased from room temperature (23° C.), and after the impregnation temperature shown in Table 6 was reached, carbon dioxide as blowing agent was injected into the autoclave until the pressure in the autoclave reached the impregnation pressure shown in Table 6. At this time, the heating-up period from room temperature (23° C.) to the impregnation temperature shown in Table 6 was 30 minutes. The temperature rising rate was taken as the average rate obtained by subtracting room temperature (23° C.) from the impregnation temperature shown in Table 6, and dividing by the heating up period. Subsequently, the retention temperature and the retention time and pressure in the retention step shown in Table 6 were maintained.

The polyamide-based resin beads impregnated with the blowing agent were then discharged together with the dispersion under atmospheric pressure (0.1 MPa). The resulting polyamide-based resin expanded beads were cured in an oven at 60° C. for 24 hours and then gradually cooled to obtain polyamide-based resin expanded beads.

Table 6 shows the heat of fusion (J/g), apparent density, closed cell ratio, and average foam cell size of the obtained expanded beads.

Example 472

[Production of Polyamide-Based Resin Bead]

A resin shown in Tables 1 and 6 was supplied to the extruder, and as a foam conditioner, "Talcum Powder PK-S" (manufactured by Hayashi Kasei Co., Ltd.) was added so as to have a content of 8000 mass ppm. The mixture was melted and kneaded. The molten kneaded product was extruded from a small nozzle attached to the tip of the extruder as a single layer strand having a circular cross section. The extruded strand was cooled with water, then cut into pieces having a mass of about 2.0 mg each with a pelletizer and dried to obtain polyamide-based resin beads.

[Production of Polyamide-Based Resin Expanded Bead]

The obtained polyamide-based resin beads were placed in a 10° C. autoclave, and left to stand in a carbon dioxide atmosphere of 4.0 MPa for 3 hours to impregnate the polyamide-based resin beads with carbon dioxide. The beads were taken out, placed in a hot air foamer, and 240° C. hot air was blown for 20 seconds to obtain polyamide-based resin expanded beads.

Example 473

The expanded beads obtained in Example 472 were placed in a pressure vessel held at 70° C., compressed air was introduced for 24 hours until the pressure in the pressure vessel reached 0.60 MPa, and then the expanded beads were held for 24 hours. The obtained expanded beads were taken out, placed in a hot air foamer, and 240° C. hot air was blown for 20 seconds to obtain polyamide-based resin expanded beads.

In addition, the bead shape of the expanded beads obtained in Examples 411 to 414 and 471 to 473 was evaluated as follows. The results are shown in Table 6.

[Method for Measuring Average Foam Cell Size of Expanded Bead]

First, an expanded bead was split into about two through the center of the expanded bead, and a cross section thereof was photographed with a scanning electron microscope. Next, on the cross-sectional photograph, straight lines were drawn in 8 directions at equal intervals from near the center of the cross-section of the expanded bead, and the number of all the foam cells intersecting with the lines in total was counted. The value obtained by dividing the total length of the lines by the number of foam cells counted was defined as the foam cell size of the expanded bead. The procedure was performed in the same manner for 10 or more expanded beads, and the arithmetic mean of the foam cell sizes of the respective expanded beads was defined as the average foam cell size of the expanded beads.

[Method for Measuring Surface Layer Film Thickness of Expanded Bead]

First, 50 expanded beads were randomly selected. Next, the expanded beads were cut through their center and split into two. In one cross section of each cut expanded bead, four lines were drawn at equal angles 45 degrees apart from each other from the outermost surface of the expanded bead through the center and until the opposite outermost surface. On the lines, the respective lengths from the outermost surface of the expanded bead to a foam cell positioned outermost of the expanded bead (thickness of outermost layer) were measured, and the average thickness of the outermost layer of each expanded bead was determined by calculating the arithmetic mean of those values. Further, the average surface layer film thickness of the expanded beads was determined by calculating the arithmetic mean of those values.

[Production of Polyamide-Based Resin Expanded Bead Molded Body]

A plate-forming mold having a length of 200 mm, a width of 250 mm and a thickness of 50 mm was filled with the polyamide-based resin expanded beads obtained after closing the mold, and in-mold forming was performed by steam heating to obtain an expanded bead molded body in a plate form. The heating method was carried out by supplying steam for 5 seconds with the drain valves on both sides of the mold opened for preheating (exhaustion step), then supplying steam from the mold on the moving side, followed by supplying steam from the mold on the stationary side, and then heating to the forming and heating steam pressure (forming pressure=forming vapor pressure).

After the heating ended, the pressure was released, and the molded body was cooled with water until the surface pressure due to the expanding force of the molded body decreased to 0.02 MPa (gauge pressure). The mold was then opened and the molded body was removed from the mold.

(Water Cooling Time of Expanded Bead Molded Body)

The water cooling time of the expanded bead molded body was taken as the water cooling time (seconds) taken from the start of water cooling until the surface pressure reached 0.02 MPa (gauge pressure).

(Forming Cycle of Expanded Bead Molded Body)

In the forming cycle of the expanded bead molded body, the time (seconds) from the start of closing the molding mold to the removal of the molded body was measured.

(Secondary Expandability of Expanded Bead Molded Body)

The secondary expandability of an expanded bead molded body was evaluated as follows.

A: The gap between expanded beads at the surface of a molded body is filled.

C: The gap between expanded beads at the surface of a molded body is unfilled.

(Resiliency of Expanded Bead Molded Body)

The thicknesses of an end portion (10 mm inside from the end) and a central portion (portion equally dividing in the longitudinal direction and in the cross direction) of the expanded bead molded body corresponding to the dimensions of the mold in a plate shape used in the in-mold forming were measured. Subsequently, a thickness ratio of the expanded bead molded body ((Thickness of central portion of the molded body)/(Thickness of the end portion of the molded body)×100(%)) was calculated for evaluation as follows.

A: Thickness ratio is 90% or more.

C: Thickness ratio is less than 90%.

(Fusion Splicing Properties of Expanded Bead Molded Body)

The fusion ratio of the molded body was determined based on the ratio of the number of expanded beads in which the material failure was occurred among the expanded beads exposed on a fracture surface when the expanded bead molded body was fractured. Specifically, first, a test piece (100 mm length×100 mm width×thickness: thickness of the molded body) was cut out from the expanded bead molded body, a notch of about 5 mm was cut in the thickness direction of each test piece with a cutter knife, and the test piece was fractured from the notch. Next, a number (n) of expanded beads present on the fracture surface of the expanded bead molded body and a number (b) of expanded beads in which the material failure had occurred were measured, and the fusion splicing properties were evaluated as follows based on the ratio (b/n) between (b) and (n) expressed as a percentage.

A: Material failure at fracture surface of 80% or more

B: Material failure at fracture surface of 60% or more and less than 80%

C: Material failure at fracture surface of less than 60%

TABLE 6

| | | | Example 411 | Example 412 | Example 413 | Example 414 | Example 471 | Example 472 | Example 473 |
|---|---|---|---|---|---|---|---|---|---|
| Resin bead | | Resin | 5033B | 5033B | 1030B | 5033B | 5033B | 5033B | |
| | | Melting point Tm (° C.) *1 | 197 | 197 | 220 | 197 | 197 | 197 | |
| | | Amount of foam conditioner (mass ppm) | 3000 | 3000 | 3000 | 300000 | 1000 | 8000 | |
| Expanded bead | Production conditions | Blowing agent type | $CO_2$ | $CO_2$ | $CO_2$ | $CO_2$ | $CO_2$ | $CO_2$ | |
| | | Impregnation step — Impregnation temperature (° C.) | 136.0 | 136.5 | 158.4 | 136.0 | 138.0 | 10 | |
| | | Impregnation pressure (MPa [G]) | 4.0 | 4.0 | 4.0 | 4.0 | 2.0 | 4.0 | |
| | | Retention step — Retention time (min) | 15 | 15 | 15 | 15 | 15 | 180 | |
| | | Retention temperature (° C.) | 136.0 | 136.5 | 158.4 | 136.0 | 138.0 | 10 | |
| | | Tm - retention temperature (° C.) | 61.0 | 60.5 | 61.6 | 61.0 | 59.0 | 187.0 | |
| | | Pressure (MPa [G]) | 4.0 | 4.0 | 4.0 | 4.0 | 2.0 | 4.0 | |
| | | Expanding step — Temperature Te (° C.) of dispersion immediately before expanding | 136.0 | 136.0 | 158.4 | 136.0 | 138.0 | 240 | |
| | | Tm-Te (° C.) | 61.0 | 60.5 | 61.6 | 61.0 | 59.0 | −43.0 | |
| | | Expanding pressure (MPa [G]) | 4.0 | 4.0 | 4.0 | 4.0 | 2.0 | 0 | |
| | Physical property | Total heat of fusion (J/g) *3 | 56 | 54 | 83 | 56 | 55 | 32 | 37 |
| | | Heat of fusion (J/g) of high temperature peak | 16 | 13 | 17 | 13 | 11 | 0 | 0 |
| | | Ratio (%) of heat of fusion of high temperature peak to total heat of fusion | 29 | 24 | 21 | 23 | 20 | 0 | 0 |
| | | Apparent density (kg/m³) | 95 | 60 | 80 | 90 | 130 | 860 | 145 |
| | | Closed cell ratio (%) | 93 | 90 | 93 | 60 | 92 | 74 | 73 |
| | | Average foam cell size (μm) | 120 | 180 | 120 | 50 | 220 | 180 | 260 |
| | | Surface film thickness (μm) of expanded bead | 12 | 6 | 20 | 3 | 60 | 80 | 70 |
| Expanded bead Molded body | Production conditions | Water cooling time (seconds) | 65 | 60 | 90 | 5 | 20 | 5 | 30 |
| | | Forming cycle (seconds) | 105 | 100 | 140 | 45 | 60 | 45 | 70 |
| | Physical property | Resiliency | A | A | A | A | A | A | A |
| | | Secondary expandability | A | A | A | C | C | C | C |
| | | Fusion splicing property | A | A | B | B | C | C | C |

*1: Among the polyamide-based resin beads, peak top temperature of melting peak having the largest area in the DSC curve
*3: Heat of fusion obtained by summing heat of fusion of intrinsic peak and heat of fusion of high temperature peak From the results shown in Table 6, it can be seen that the polyamide-based resin expanded beads obtained in Examples 411 to 414 had a low apparent density and excellent molded body physical properties, particularly the resiliency and fusion splicing properties. Therefore, according to the fourth embodiment of the present invention, a polyamide-based resin expanded bead having an excellent lightweight property and formability can be provided.

In Example 472, the expanded beads obtained by impregnation expanding had a high apparent density. Further, in Example 473, the expanded beads were obtained by curing the expanded beads obtained in Example 472 under atmospheric pressure as is normally carried out, filling the expanded beads in another closed vessel, introducing compressed air to pressurize the expanded beads, and then further expanding by steam heating. In that case, although the apparent density was decreased, the expanded beads had a large foam cell size, indicating that the formability was insufficient.

The invention claimed is:

1. A polyamide-based resin expanded bead comprising a foam layer formed by expanding a polyamide-based resin, wherein
on a first DSC curve and a second DSC curve obtained under the following condition 1, the first DSC curve has a melting peak (intrinsic peak) inherent in the polyamide-based resin and a melting peak (high temperature peak) at a higher temperature side than the intrinsic peak, and, the peak top temperature of the melting peak of the second DSC curve is 180° C. or higher and 280° C. or lower, and
the polyamide-based resin expanded bead has an apparent density of 10 to 300 kg/m³ and a closed cell ratio of 85% or more:

Condition 1
A DSC curve measured when a foam layer of a polyamide-based resin expanded bead as a test piece is heated and melted from 30° C. to a temperature 30° C. higher than a temperature at the end of a melting peak at a heating rate of 10° C./min is defined as a first DSC curve, and a DSC curve measured when the test piece is then retained at the temperature for 10 minutes, cooled to 30° C. at a cooling rate of 10° C./min, and heated and melted again to a temperature 30° C. higher than the temperature at the end of the melting peak at a heating rate of 10° C./min is defined as a second DSC curve, each curve being measured based on heat-flux differential scanning calorimetry in accordance with JIS K7121-1987.

2. The polyamide-based resin expanded bead according to claim 1, wherein a difference between the temperature of the peak top of the intrinsic peak and the temperature of the peak top of the high temperature peak is 10° C. or more.

3. The polyamide-based resin expanded bead according to claim 1, wherein a ratio of a total heat of fusion of a heat of fusion of the intrinsic peak and a heat of fusion of the high temperature peak on the first DSC curve with respect to the total heat of fusion of the second DSC curve is 1.2 or more.

4. The polyamide-based resin expanded bead according to claim 1, wherein the ratio of the heat of fusion of the high temperature peak with respect to the total heat of fusion of the heat of fusion of the intrinsic peak and the heat of fusion of the high temperature peak on the first DSC curve is 10% or more and 45% or less.

5. The polyamide-based resin expanded bead according to claim 1, wherein the total heat of fusion of the heat of fusion of the intrinsic peak and the heat of fusion of the high temperature peak on the first DSC curve is 40 J/g or more.

6. The polyamide-based resin expanded bead according to claim 1, wherein the polymer-based resin constituting the foam layer is a polyamide copolymer.

7. The polyamide-based resin expanded bead according to claim 1, wherein the polyamide-based resin expanded bead has an average foam cell size of 20 to 200 µm.

8. The polyamide-based resin expanded bead according to claim 1, wherein the polyamide-based resin expanded bead has an apparent density of 10 to 150 kg/m³.

9. The polyamide-based resin expanded bead according to claim 1, wherein the peak top temperature of the melting peak of the second DSC curve is 185° C. or higher and 280° C. or lower.

10. The polyamide-based resin expanded bead according to claim 1, wherein the foam layer has on a surface a coating layer constituted from a polyamide-based resin, the foam layer is a core layer, and a melting point (Tms) of the polyamide-based resin constituting the coating layer and a melting point (Tmc) of the polyamide-based resin constituting the core layer satisfy the following formula 1, $$Tms < Tmc \qquad \text{(Formula 1)}.$$

11. The polyamide-based resin expanded bead according to claim 10, wherein a mass ratio (core layer/coating layer) between the core layer and the coating layer is 80/20 or more and 99/1 or less.

12. The polyamide-based resin expanded bead according to claim 10, wherein the polyamide-based resin constituting the coating layer has a smaller heat of fusion than the heat of fusion of the polyamide-based resin constituting the core layer.

* * * * *